(12) United States Patent
Fung et al.

(10) Patent No.: US 6,523,058 B1
(45) Date of Patent: Feb. 18, 2003

(54) STATE MACHINE DRIVEN TRANSPORT PROTOCOL INTERFACE

(75) Inventors: Anthony Fung, Pleasanton, CA (US); Peter Groz, San Jose, CA (US); Jim C. Hsu, Santa Clara, CA (US); Danny K. Hui, Newark, CA (US); Harry S. Hvostov, San Jose, CA (US)

(73) Assignee: STMicroelectronics Inc., Carrollton, TX (US)

( * ) Notice: Subject to any disclaimer, the term of this patent is extended or adjusted under 35 U.S.C. 154(b) by 0 days.

(21) Appl. No.: 09/163,096

(22) Filed: Sep. 29, 1998

(51) Int. Cl.$^7$ .................................................. G06F 9/00
(52) U.S. Cl. ........................ 709/100; 709/201; 709/226; 709/227; 709/102; 710/6; 710/109; 710/113
(58) Field of Search ................................ 709/100, 101, 709/102, 103, 104, 105, 106, 108, 201, 226, 227, 230, 250; 710/6, 109, 113, 117, 128, 310; 370/462, 528

(56) References Cited

U.S. PATENT DOCUMENTS

| | | | | |
|---|---|---|---|---|
| 5,471,634 A | * | 11/1995 | Giorgio et al. | 707/104.1 |
| 5,555,244 A | * | 9/1996 | Gupta et al. | 370/397 |
| 5,983,274 A | * | 11/1999 | Hyder et al. | 709/230 |
| 5,991,829 A | * | 11/1999 | Giorgio et al. | 710/15 |
| 6,081,846 A | * | 6/2000 | Hyder et al. | 709/250 |
| 6,151,390 A | * | 11/2000 | Vilftsun et al. | 379/229 |
| 6,334,161 B1 | * | 12/2001 | Suzuki et al. | 710/29 |
| 6,425,019 B1 | * | 7/2002 | Tateyama et al. | 710/11 |

* cited by examiner

Primary Examiner—Majid A. Banankhah
(74) Attorney, Agent, or Firm—Lisa K. Jorgenson; David V. Carlson

(57) ABSTRACT

A system architecture for a high speed serial bus compatible with the 1394 standard is disclosed. A transaction interface coordinates data packets received from or sent to a 1394 bus. A kernel/scheduler/dispatcher is used to allocate memory resources, and start a variety of tasks and services. The tasks and services vary depending on protocols used in a transport layer and application layer used in conjunction with the 1394 layers. Each task operates according to a state machine progression. The transaction interface uses information derived from the data packets received to form message control blocks, particular for each individual task, and places the control blocks into the proper task queue. The transaction interface forms a dispatcher message control block and places it into the scheduler/dispatcher queue to initiate the task. If there are no other message control blocks in the queue particular for the called task, the called task is immediately started. Otherwise, the message control block waits in the queue to eventually be operated on.

22 Claims, 13 Drawing Sheets

1. MMC Block Data structure

| Byte Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | tl | | | | | | spd | | | timer_ID | | | | | | |
| 02 | source_ID | | | | | | | | | | | | | | | |
| 04 | mgmt_ORB_addr (hi) | | | | | | | | | | | | | | | |
| 06 | mgmt_ORB_addr (mid) | | | | | | | | | | | | | | | |
| 08 | mgmt_ORB_addr (lo) | | | | | | | | | | | | | | | |
| 10 | task_state | | | | | | | | next_task_state | | | | | | | |
| 12–42 | Management ORB or Task ORB (32 bytes) | | | | | | | | | | | | | | | |
| 44 | next_MMC_Blk_pointer | | | | | | | | | | | | | | | |

Descriptions of each field:

| | |
|---|---|
| tl | Transaction label |
| spd | Speed to communicate with the initiator |
| timer_ID | The timer allocated for this management ORB |
| source_ID | Initiator node ID |
| mgmt_ORB_addr | Address of the management ORB address |
| task_state | Internal state of the Management Agent Task |
| next_task_state | The next task_state to transition to |
| Management ORB or Task ORB | The 32 byte ORB content from the initiator |
| next_MMC_Blk_pointer | Pointer to the next MMC Block |

| CURRENT STATE | Function | Transaction confirmation req | No transaction confirmation req | Reconnect: read EUI-64 | Set password: read pwd req | Query Logins: query resp sent | Login func: read pwd request | Login func: login respe sent | Login func: read EUI-64 | ORB func completed without err | ORB func completed with error | No free UMC Block | No free TMC Block | Fetch management ORB | Transaction compl with error | No MMC Block in queue | Next MMC Block available | Split transaction time out | Send ORB write response |
|---|---|---|---|---|---|---|---|---|---|---|---|---|---|---|---|---|---|---|---|

NEXT STATE columns (left to right):
1. WAIT_FOR_TMC_RESOURCE
2. MGMT_AGENT_WRITE (done)
3. WAIT_FOR_RECONNECT_EUI
4. WAIT_FOR_TMC_RESOURCE
5. MGMT_AGENT_WRITE (done)
6. WAIT_FOR_TMC_RESOURCE
7. MGMT_AGENT_WRITE (done)
8. WAIT_FOR_TMC_RESOURCE
9. MGMT_AGENT_WRITE
10. MGMT_AGENT_WRITE (done)
11. WAIT_FOR_TMC_RESOURCE
12. MGMT_AGENT_WRITE
13. MGMT_AGENT_WRITE (done)

CURRENT STATE: WAIT_FOR_ORB_FETCH

Functions (bottom row, grouped across columns): logout | reconnect | terminate | abort task | abort task set

| Row | 1 | 2 | 3 | 4 | 5 | 6 | 7 | 8 | 9 | 10 | 11 | 12 | 13 |
|---|---|---|---|---|---|---|---|---|---|---|---|---|---|
| Reconnect: read EUI-64 | | | X | | | | | | | | | | |
| ORB func completed without err | X | X | | | | X | X | X | | X | | X | X |
| ORB func completed with error | | | | X | | | | | X | | X | | X |
| No free TMC Block | X | | | X | | X | | X | | | X | | |
| No MMC Block in queue | | X | | | X | | X | | X | X | | X | X |
| Next MMC Block available | | X | | | X | | X | | X | X | | X | |

FIG. 10C

| CURRENT STATE | Function | | | Transaction confirmation req | No transaction confirmation req | Reconnect: read EUI-64 | Set password: read pwd req | Query Logins: query resp sent | Login func: read pwd request | Login func: login respe sent | Login func: read EUI-64 | ORB func completed without err | ORB func completed with error | No free UMC Block | No free TMC Block | Fetch management ORB | Transaction compl with error | No MMC Block in queue | Next MMC Block available | Split transaction time out | Send ORB write response | NEXT STATE |
|---|---|---|---|---|---|---|---|---|---|---|---|---|---|---|---|---|---|---|---|---|---|---|
| WAIT_FOR_ORB_FETCH | clear task set | | | | | | | | | | | | | | X | | | | | | | WAIT_FOR_TMC_RESOURCE |
| | | | | | | | | | | | | X | | | | | | | X | | | | WAIT_FOR_CTS_UMC |
| | | | | | | | | | | | | X | | | | | | X | X | | | | MGMT_AGENT_WRITE |
| | | | | | | | | | | | | | X | | | | | X | | | | | MGMT_AGENT_WRITE |
| | | | | | | | | | | | | X | | | | | | | | | | | (done) |
| | | | | | | | | | | | | | X | | | | | | | | | | (done) |
| | logical unit reset | | | | | | | | | | | | | | X | | | | | | | | WAIT_FOR_TMC_RESOURCE |
| | | | | | | | | | | | | X | | X | | | | | | | | | WAIT_FOR_LUR_UMC |
| | | | | | | | | | | | | X | | | | | | X | X | | | | MGMT_AGENT_WRITE |
| | | | | | | | | | | | | | X | | | | | X | | | | | MGMT_AGENT_WRITE |
| | | | | | | | | | | | | X | | | | | | | | | | | (done) |
| | | | | | | | | | | | | | X | | | | | | | | | | (done) |
| | target reset | | | | | | | | | | | | | | | X | | | | | | | WAIT_FOR_TMC_RESOURCE |
| | | | | | | | | | | | | X | | X | | | | | | | | | WAIT_FOR_TR_UMC |
| | | | | | | | | | | | | X | | | | | | X | X | | | | MGMT_AGENT_WRITE |
| | | | | | | | | | | | | | X | | | | | X | | | | | MGMT_AGENT_WRITE |
| | | | | | | | | | | | | X | | | | | | | | | | | (done) |
| | | | | | | | | | | | | | X | | | | | | | | | | (done) |

| Function | NEXT STATE → | LOGIN_RESPONSE_SENT | WAIT_FOR_LOGIN_PASSWORD | WAIT_FOR_TMC_RESOURCE | MGMT_AGENT_WRITE (done) | WAIT_FOR_TMC_RESOURCE | MGMT_AGENT_WRITE (done) | LOGIN_RESPONSE_SENT | WAIT_FOR_TMC_RESOURCE | MGMT_AGENT_WRITE (done) | WAIT_FOR_TMC_RESOURCE | MGMT_AGENT_WRITE (done) | WAIT_FOR_TMC_RESOURCE | MGMT_AGENT_WRITE (done) | WAIT_FOR_TMC_RESOURCE | MGMT_AGENT_WRITE (done) | WAIT_FOR_CTS_UMC |
|---|---|---|---|---|---|---|---|---|---|---|---|---|---|---|---|---|---|
| | Transaction confirmation req | | | | | | | | | | | | | | | | |
| | No transaction confirmation req | | | | | | | | | | | | | | | | |
| | Reconnect: read EUI-64 | | | | | | | | | | | | | | | | |
| | Set password: read pwd req | | | | | | | | | | | | | | | | |
| | Query Logins: query resp sent | | | | | | | | | | | | | | | | |
| | Login func: read pwd request | X | | | | | | | | | | | | | | | |
| | Login func: login respe sent | X | | | | X | | | | | | | | | | | |
| | Login func: read EUI-64 | | | | | | | | | | | | | | | | |
| | ORB func completed without err | | | | | X | X | | X | X | X | X | X | X | X | X | |
| | ORB func completed with error | | | X | X | | | | | | | | | | | | |
| | No free UMC Block | | | | | | | | | | | | | | | | X |
| | No free TMC Block | | X | | X | | | X | X | | X | | X | | X | | |
| | Fetch management ORB | | | | | | | | | | | | | | | | |
| | Transaction compl with error | | | | | | | | | | | | | | | | |
| | No MMC Block in queue | | | X | | X | | | X | | X | | X | | X | | |
| | Next MMC Block available | | X | | X | | X | | | X | | X | | X | | X | |
| | Split transaction time out | | | | | | | | | | | | | | | | |
| | Send ORB write response | | | | | | | | | | | | | | | | |

CURRENT STATE (below columns): WAIT_FOR_LOGIN_EUI | LOGIN_RESPONSE_SENT | WAIT_FOR_LOGIN_PASSWORD | QUERY_LOGINS_RESPONSE_SENT | WAIT_FOR_SET_PASSWORD | WAIT_FOR_RECONNECT_EUI | WAIT_FOR_CTS_UMC

| CURRENT STATE / Function | WAIT_FOR_TMC_RESOURCE | MGMT_AGENT_WRITE (done) | WAIT_FOR_LUR_UMC | WAIT_FOR_TMC_RESOURCE | MGMT_AGENT_WRITE (done) | WAIT_FOR_TR_UMC | WAIT_FOR_TMC_RESOURCE | MGMT_AGENT_WRITE (done) | WAIT_FOR_TMC_RESOURCE | MGMT_AGENT_WRITE (done) | WAIT_FOR_ORB_WRT_RESP | WAIT_FOR_ORB_FETCH | WAIT_FOR_LOGIN_EUI | LOGIN_RESPONSE_SENT | WAIT_FOR_LOGIN_PASSWORD | QUERY_LOGINS_RESPONSE_SENT | WAIT_FOR_SET_PASSWORD | WAIT_FOR_RECONNECT_EUI |
|---|---|---|---|---|---|---|---|---|---|---|---|---|---|---|---|---|---|---|
| Transaction confirmation req | | | | | | | | | | | x | x | x | x | x | x | x | x |
| No transaction confirmation req | | | | | | | | | | | x | x | | | | | | |
| Reconnect: read EUI-64 | | | | | | | | | | | | | | | | | | |
| Set password: read pwd req | | | | | | | | | | | | | | | | | | |
| Query Logins: query resp sent | | | | | | | | | | | | | | | | | | |
| Login func: read pwd request | | | | | | | | | | | | | | | | | | |
| Login func: login respe sent | | | | | | | | | | | | | | | | | | |
| Login func: read EUI-64 | | | | | | | | | | | | | | | | | | |
| ORB func completed without err | x | x | | | x | x | | x | x | | | | | | | | | |
| ORB func completed with error | | | | | | | | | | | | | | | | | | |
| No free UMC Block | | | x | | x | | | | | | | | | | | | | |
| No free TMC Block | x | | | x | | x | | | x | | | | | | | | | |
| Fetch management ORB | | | | | | | | | | | | | | | | | | |
| Transaction compl with error | | | | | | | | | | | | | | | | | | |
| No MMC Block in queue | | x | | x | | | x | | | x | | | | | | | | |
| Next MMC Block available | | x | | x | | | x | | x | | | | | | | | | |
| Split transaction time out | | | | | | | | | | | | | | | | | | |
| Send ORB write response | | | | | | | | | | | | | | | | | | |
| WAIT_FOR_LUR_UMC | | | | | | | | | | | | | | | | | | |
| WAIT_FOR_TR_UMC | | | | | | | | | | | | | | | | | | |
| WAIT_FOR_TMC_RESOURCE | | | | | | | | | | | | | | | | | | |

FIG. 10E

STATE MACHINE DRIVEN TRANSPORT PROTOCOL INTERFACE

TECHNICAL FIELD

This invention relates to communication between devices connected to a data communication system. More specifically, this invention relates to a transport interface that receives data packets from a high-speed serial bus and causes functions to be performed at nodes of the bus based on the contents of the data packets. The functions are performed by a set of tasks specifically chosen to implement a particular transport protocol. Each task within the set of tasks operates as a state machine according to a set of pre-ordained rules.

BACKGROUND OF THE INVENTION

In general, there are two types of data buses: serial and parallel. A parallel bus is typically measured in capacity and speed. Parallel bus width capacity is measured in bytes and speed is usually measured in MHz or bytes/second. For example, the popular Peripheral Component Interconnect (PCI) bus is a parallel bus 32 bits wide and operating up to 33 MHz. At this frequency it can carry data at a rate of over 1 Gigabit per second (1 Gbps). A defining feature of a parallel bus is that all of the bits in its width are sent simultaneously, for instance, in the PCI bus, all 32 bits are sent at the same time during a cycle. This requires at least as many signal lines in the bus as its width, and additional lines for addressing, power, and other signals. The PCI bus has nearly 50 signal lines. Signal lines are usually embodied as traces on a printed circuit board or wires. The large number of signal lines in a parallel bus makes it expensive to implement. Additionally, the number of devices on a PCI bus is limited and each device requires a card and an open corresponding card slot to plug into the bus.

A serial bus, conversely, transfers data one bit at a time. Although this reduces the number of lines needed for the serial bus, it greatly extends the time needed to transmit data as compared to a parallel bus. For instance, if operating at the same frequency, a serial bus transmits only one bit of data in the same time a PCI bus transmits 32 bits. An example of a serial bus is the Universal Serial Bus (USB). This bus contains 4 wires, and has a maximum data rate of 12 Megabits per second (Mbps). The low number of wires makes a serial bus ideal for interconnecting devices via a cable, as the cable can be manufactured inexpensively. However, because data intensive applications require a high volume of data to be quickly moved, manufacturers have generally relied on parallel, rather than serial buses for interconnecting data-intensive devices. Applications using such data-intensive devices include video and audio reproduction, and high-speed storage mechanisms such as hard disk drives, among others.

Until now, designers of systems that move data over a bus had to choose between the fast and expensive parallel bus, or the slow and inexpensive serial bus.

Recently, specifications for a high-speed serial bus were adopted by the Institute of Electrical and Electronics Engineers. The specification, IEEE 1394-1995, is known as "FireWire", or simply, 1394. The 1394 specification includes standards for data transfer rates of up to 400 Mbps using only 2 pairs of data wires and 1 pair of wires for power. This data rate is fast enough to accommodate the data intensive needs of video, audio and high speed storage. Future needs will be met by another proposed 1394 standard having a data rate over 1 Gbps. Therefore, by using a 1394 standard bus, data intensive tasks can be inexpensively implemented on a serial bus without the drawbacks of using a parallel bus.

The 1394 bus uses a peer-to-peer architecture. Physical and logical nodes attach to the 1394 bus by means of a six-conductor cable. Up to 63 nodes can be connected on each independent bus bridge, and 1,023 bridges are allowed in the system, for a total of over 65,000 devices on one 1394 system. It is likely that a 1394-to-PCI interface, possibly using the Open Host Controller Interface (OHCI) standard, will be used when using a 1394 bus in a computer. However, strictly speaking, the 1394 bus can operate independently from a computer by coupling related devices together via the connection cable. In addition to a cable specification, a backplane specification is provided for the 1394 bus. The backplane specification will most likely be used for a bus within a computer or some other wholly-contained system. The transport protocol interface described herein operates in either the cable or backplane environment.

The 1394 standard specifies three "layers," physical, link, and transaction. The physical layer transmits electrical signals along the serial bus, arbitrates the bus by ensuring that only one node is sending data at a time, and translates electrical signals sensed from the bus into data signals for the link layer. The link layer assembles the data signals retrieved from the bus into data packets, and provides services such as addressing, data checking, and generating a "cycle" signal used for timing and synchronization. The transaction layer accepts the data packets from the link layer and includes bus transactions required to support a command and status register (CSR) architecture, including read, write, and lock. Several other buses use the CSR standard and specifying that 1394 must also conform to the CSR standard makes it easy to adapt or connect a 1394 bus to these other buses. Generally, the physical and link layers, as well as a limited number of transaction functions appear in hardware. The remainder of the transaction layer functions are performed in software.

To be useful, additional communication layers must communicate with and operate above the 1394 layers. For instance, directly above the transaction layer is a transport layer, using for example, Serial Bus Protocol-2 (SBP-2) or the standard IEC 61883 FCP/CMP, referred to as Functional Control Protocol (FCP). These standards define a protocol for the transport of commands and data over high performance serial buses. Additionally, above the transport layer is an application layer using such protocol standards as Reduced Block Commands (RBC), Printer Working Group (PWG), or Internet Protocol (IP). The interaction of these layers with each other and with the layers of the 1394 specification are further described herein.

It is thus desirable to have a transport protocol interface that performs all of the duties outlined in the 1394 specification in an expedient manner. It is also desirable for the transport protocol interface to be easily scaleable to include new services and tasks. It is also an advantage to develop a transport protocol interface architecture that can be easily modified for a variety of roles and functions.

SUMMARY OF THE INVENTION

In a data communication system, for instance a 1394 bus system, a transaction interface operates at a logical node on the bus. As packets are sent along the bus directed towards the specific node on which the transaction interface sits, the transaction interface decodes the packet contents into control blocks for further operation. The further operation can include execution by an application also operating at the local node. Additionally, the application may require data to be transmitted to another node on the bus. In this case, the application communicates with the transaction interface via message control blocks, which are then converted into data signals and placed on the bus to be received at the destination node.

In accordance with one aspect of the present invention, a transport protocol interface that is coupled to a serial bus is provided including a decoder coupled to the serial bus and structured to decode signals received from the serial bus into functions and data adhering to a transport protocol. The transport protocol interface also includes a plurality of tasks, each task structured to perform functions required by the transport protocol, and each task including at least one logic state and operating according to a predetermined state machine progression.

In other embodiments of the invention, a scheduler structured to start the tasks is part of the transport protocol interface. In still other embodiments of the invention, each task is structured to change states when it schedules another task or when it calls a service. At least one of the states in one of the plurality of tasks is structured to be in a suspended state pending notification by the scheduler that it can leave the suspended state and, in those embodiments including a scheduler, the scheduler is structured to enable the task in the suspended state to change states following notification to the task.

In another aspect of the present invention, a method to implement a function in a transport protocol is provided. The method includes steps of receiving the function of the transport protocol and passing to a task the necessary data to operate on the function. The task is in an initial state when the data is passed to it and the task has one or more states. The task then operates on the task and returns notification that the function has been completed.

In more embodiments of the invention, the task comprises more than one state and operating on the data includes changing states within the task.

BRIEF DESCRIPTION OF THE DRAWINGS

FIG. 4 is a chart showing a message control block structure.

FIGS. 10A–10E are charts showing the states of the Management Agent Task

DETAILED DESCRIPTION OF THE INVENTION

Figure 1:
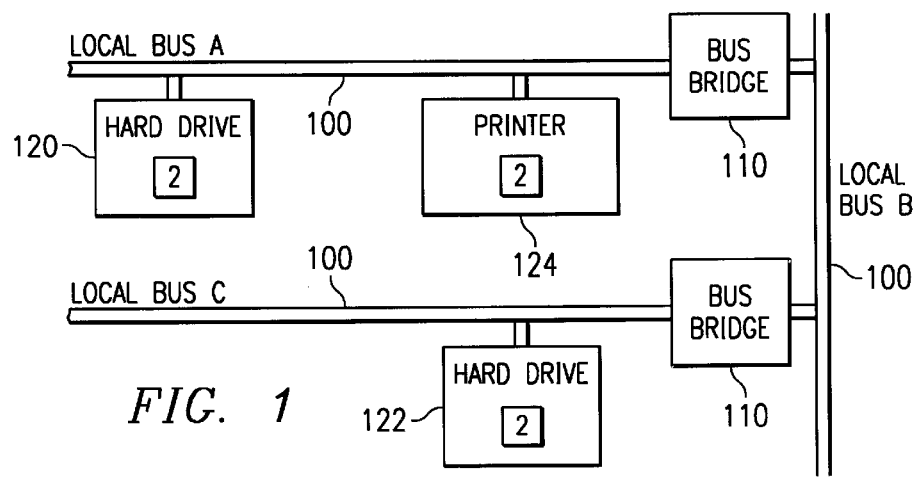
FIG. 1 is a diagram showing a possible 1394 bus configuration.

FIG. 1 shows one method of implementing a 1394 bus architecture. A bus 100 is subdivided into three local buses, A, B, and C. Both the local bus A and local bus C use a bus bridge 110 to connect to the local bus B. Devices sit as nodes on the local buses. A layer structure 2, described below, is contained within all of the nodes on the bus. The devices can be any device used to generate, accept, or transmit data, such as a first hard disk drive 120, a second hard disk drive 122, or a printer 124. Each local bus can have a maximum of 63 nodes, however, by using bus bridges, a 1394 bus system can have over 65,000 nodes. Typically data traffic is limited to a local bus so that, for example, devices on the local bus C cannot see data passed on local bus A. This increases bandwidth of the bus system by only passing data on a local bus that is directed to that local bus. The bus bridge 110 monitors bus traffic on the local bus to which it is attached looking for data intended for a node on another local bus. If such data is sensed, the bus bridge 110 forwards the data to the desired bus. Therefore, the printer 124 on the local bus A can receive data from either the hard disk drive 120 (on local bus A) or from the hard disk drive 122 through the local bus bridge 110 (on local bus B). Additionally, the bus bridge 110 could couple the 1394 bus to a bus typically used in a computer, such as a PCI bus (not shown).

Figure 2:
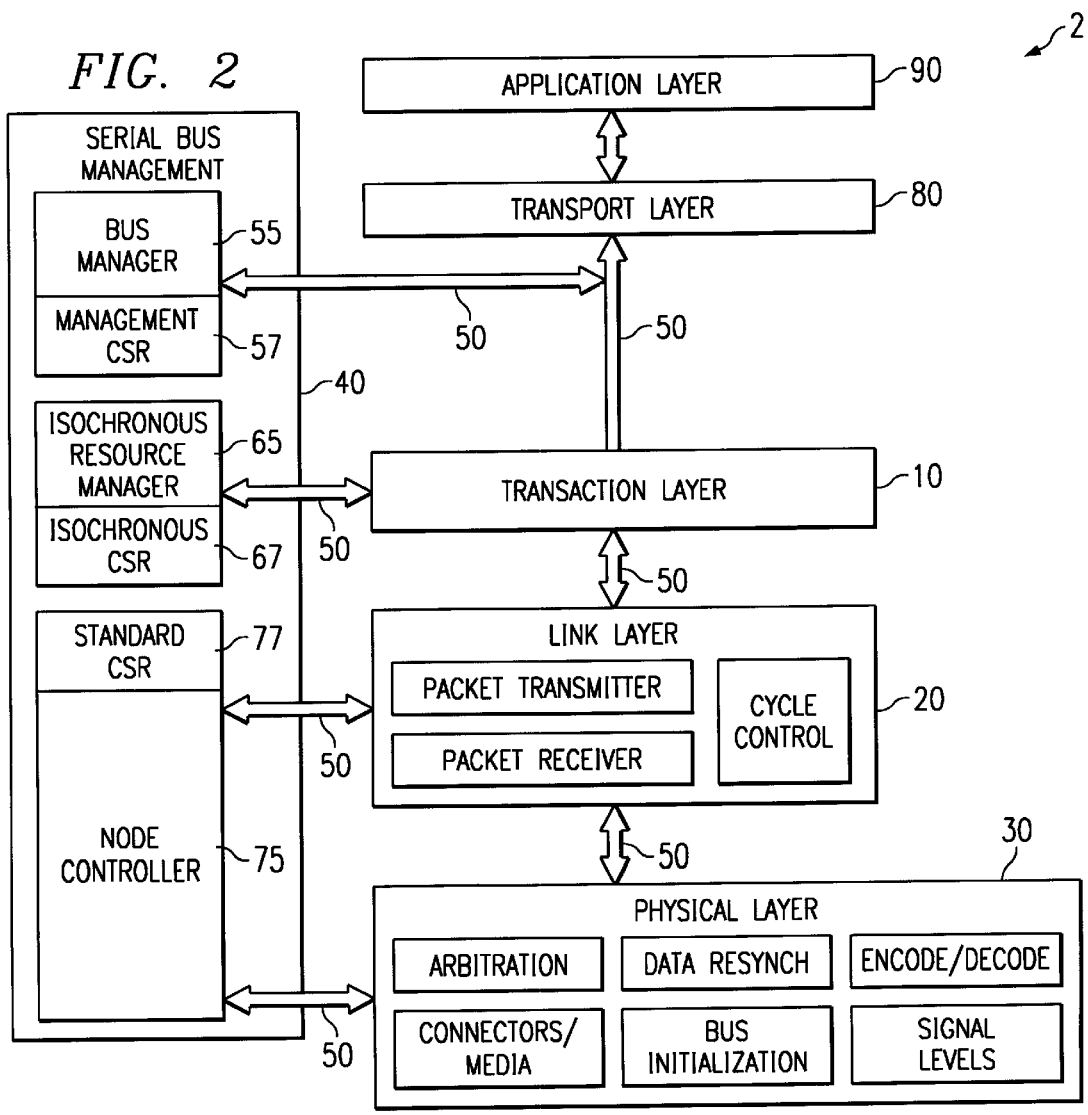
FIG. 2 is a diagram showing layers of the 1394 standard as well as layers that interact with the layers of the 1394 standard.

FIG. 2 shows a general overview of the layer structure 2 of 1394, including serial bus management. This layer structure appears in every node attached to a local 1394 bus. The layer structure 2 includes a transaction layer 10, a link layer 20, a physical layer 30, and serial bus management 40. In conjunction with the 1394 layers, a transport layer 80 and an application layer 90 are also used, as described above. Communication between the layers 10, 20, 30 and serial bus management 40 as well as with the layers 80 and 90 is through bi-directional inter-layer communication 50, which can include more than one communication path. Communication 50 need not be a data bus, but may be any of a number of communication methods, such as signal wires, shared memory resources, or other means. As shown in FIG. 2, the transaction layer 10 directly communicates with the link layer 20, a bus manager 55 and passes isochronous signals to an isochronous resource manager 65 contained within the serial bus management 40.

Layers in a communication system, such as the 1394 bus are situated to work independent from but in conjunction with layers around them. Generally, the farther a layer is from the hardware, such as the data wires of a 1394 bus, the higher order it is. Higher order layers can perform higher order functions. For instance, the transaction layer 10 of the 1394 specification performs only read, write and lock functions. A transport layer 80 communicates with the transaction layer 10 and has higher order commands. The particular transport layer standard used determines its commands. For examples, in the SBP-2 transport layer, commands such as login, reconnect, and set password, for example, are available. Above the transport layer 80 is an application layer 90, that uses protocols such as RBC, PWG, or IP. The application layer 90 works in conjunction with software to perform the desired application.

The 1394 specification includes two basic data transfer services, isochronous data transfer and asynchronous data transfer. The isochronous data transfer specification provides for packets to be sent along the high-speed serial bus at regular intervals. Typically the isochronous data transfer services are used for large volumes of data carried between a data generator and a data receiver, for example, a digital video camera and multimedia electronics, such as a video display, or video editor. Isochronous data transfer communicates directly with the link layer 20 and bypasses the transaction layer 10. The transaction layer is only used for asynchronous data transfer.

The majority of the bandwidth within the 1394 specification is reserved for isochronous data transfer, with twenty percent of the bandwidth being for asynchronous data transfer.

A node controller 75 is connected directly to the link and physical layers.

The bus manager 55, the isochronous resource manager 65 and node controller 75 are each driven according to the CSR standard, IEEE 1212-1991. Other types of buses also utilize this CSR standard, expanding the connectivity of a 1394 bus. The CSRs are located within the serial bus management 40 and are represented as a management CSR 57, an isochronous CSR 67, and standard CSR 77.

The layer structure 2 including serial bus management 40 resides in each mode along the bus. However, only one bus manager 55 and one isochronous resource manager 65 on the local bus is active. These managers exercise management responsibilities over the entire local bus. Since each local bus only needs (and may only have) one bus manager 55 and one isochronous resource manager 65, the other nodes disable their respective bus manager and isochronous resource managers. The node controller 75 is active for all operative nodes.

As stated above, the link layer 20 and physical layer 30 are generally embodied in hardware, for example, a chip available from Silicon System Design, Inc., or also available from Texas Instruments, Inc. The transaction layer 10, transport layer 80, application layer 90, and other functions of the transport interface will generally be implemented in software form, i.e., a software program executed once it is loaded into memory. In a preferred embodiment, the layers and functions are stored in firmware, e.g., codes programmed into a programmable storage device, such as a Read Only Memory (ROM), a Programmable Logic Array (PLA) or Disk Drive overlay. Further, the layers and functions could be programmed into an Application Specific Integrated Circuit (ASIC), by a method well known in the art. Generally, a collection of operations, such as those listed above operates faster in hardware rather than software, however, a software program is easier to change, correct, and update. The preferred embodiment of firmware combines advantages of both hardware and software.

Figure 3:
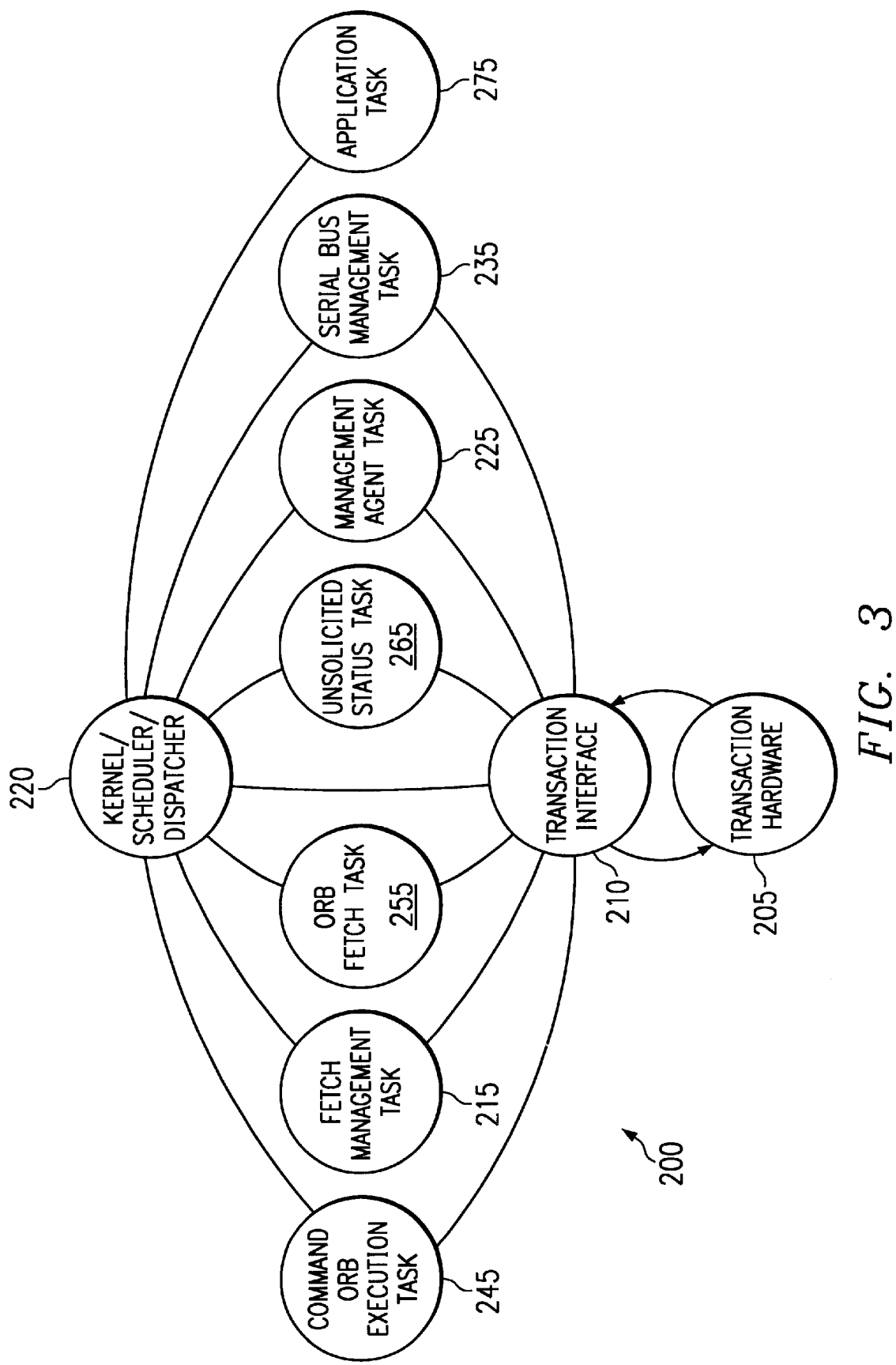
FIG. 3 is a diagram showing services and tasks according to an embodiment of the present invention.

FIG. 3 shows an embodiment of the present invention. A transport protocol interface 200 appears in each node on the bus, such as in the Hard Disk Drives 120, 122 or in the Printer 124 shown in FIG. 1. The Transaction Interface 210 embodies some of the components shown in FIG. 2. With reference to the components shown in FIG. 3, a chip embodying Transaction Hardware 205 could be the previously mentioned chips by Silicon System Design or Texas Instruments. The Transaction Interface 210 implements the 1394 transaction layer. The Serial Bus Management Task 235 implements bus management functions, such as reset or power on reset. The remainder of the representations shown on FIG. 3 implement functions and commands determined by the transport layer, such as SBP-2, in conjunction with the application layer, such as RBC.

With the exception of the Transaction Hardware 205, representations in FIG. 3 can be divided into two classifications, services and tasks. A task can schedule other tasks or call services. A service can only respond when called by a task, and when complete, returns to the calling task. The Transaction Interface 210 is a service, along with a Kernel/Scheduler/Dispatcher 220. The remainder of the representations shown in FIG. 3 are tasks, as described below.

The Transaction Hardware 205 monitors the 1394 bus and converts electrical signals sensed from the bus into data packets. The Transaction Interface 210 decodes the data packets received from the Transaction Hardware 205. These data packets are analyzed to determine if a task should be scheduled, a service called, or if no action is required. If a task or service needs to be started, the Transaction Interface 210 generates a message control block (MCB) based on the contents of the data packet and schedules the desired task or calls the desired service. Message control blocks are used for all inter-task or service communication and are further described below.

The smallest unit of data that the Transaction Interface 210 can operate upon is one data packet. A data packet is a group of data. At its lowest element, a digital datum is either a 1 or 0. Each individual piece of datum is called a bit. A collection of 8 bits is termed a byte, and a collection of 4 bytes (32 bits) is termed a quadlet. An asynchronous packet must be at least 4 quadlets, or 128 bits long. The first 128 bits are called a packet header. An asynchronous packet may also include a data block. The size of the data block varies but is limited to an absolute maximum based on the speed at which the 1394 bus is operating. The 1394 bus includes specifications to operate at 98.304 Mbps, 196.608 Mbps, or 393.216 Mbps. These speeds are often rounded to, respectively, 100, 200, and 400 Mbps, and are labeled S100, S200, and S400. When operating at the S100 speed, the maximum block size is 512 bytes (or 128 quadlets). When operating at S200 and S400, the maximum block size is 1024 bytes and 2048 bytes, respectively. When higher bus speed standards are approved, presumably maximum block size will increase as well.

The Transaction Interface 210 receives data from and transmits data to the 1394 bus. Concerning the transaction layer 10 of FIG. 2, there are three main functions that are sent in packets along the bus and processed by the Transaction Interface 210. These are read, write, and lock functions. For each of these functions, there are two main operations, request and response. A request is asking that a read, write or lock take place, and a response indicates that the read, write or lock was attempted, and includes a result.

Packets destined for the target node on which the Transaction Interface 210 sits are placed on the 1394 bus by an initiator. Packets routed to that particular node address are received at a receive bay in the Transaction Hardware 205 and an interrupt is generated to the Transaction Interface 210. Once the Transaction Interface 210 has completed its current task, an interrupt service routine is entered. In one embodiment, the seven types of packets that cause the interrupt are identified by a 4-bit transaction code contained in the packet header. The transaction codes for this embodiment of the invention are defined as follows:

| Transaction Code | Meaning |
|---|---|
| 0 | Write request for data quadlet |
| 1 | Write request for data block |
| 2 | Write response |
| 4 | Read request for data quadlet |
| 5 | Read request for data block |
| 6 | Read response for data quadlet |
| 7 | Read response for data block |
| B | Lock response |

As described above, a quadlet is 4 bytes and a block is either 512, 1024, or 2048 bytes, depending on the speed at which the bus is operating. A write request for a data block is asking that a data block be written to a specified destination memory address at a particular node. A write request for a data quadlet is identical to a write request for a data block, however, the amount of data written to the specified destination address fits within one data quadlet. A read request for a data block and read request for a data quadlet are requests to retrieve data from the specified destination memory address at the specified node.

Write and read requests are responded to by sending responses, including both read and write responses for both data quadlets and data blocks. A read response for a data quadlet is sent in reply to a read request for a data quadlet, with the data requested passed back within the packet header. A read response for a data block is similar to a read response for a data quadlet, however, much more data is passed back. If for some reason the read request could not be performed, no data is sent back, but an error status may be sent to the requesting node. Write responses are sent in reply to a write request for either a data quadlet or a data block. The responses send back a response code indicating whether the write was successful, and if not, relays the specific reason why it failed. In the write response, the packet header includes this response code.

Lock requests and responses work similarly, by sending an address, argument value and data in the request, and by sending data back in a response.

Figure 5:
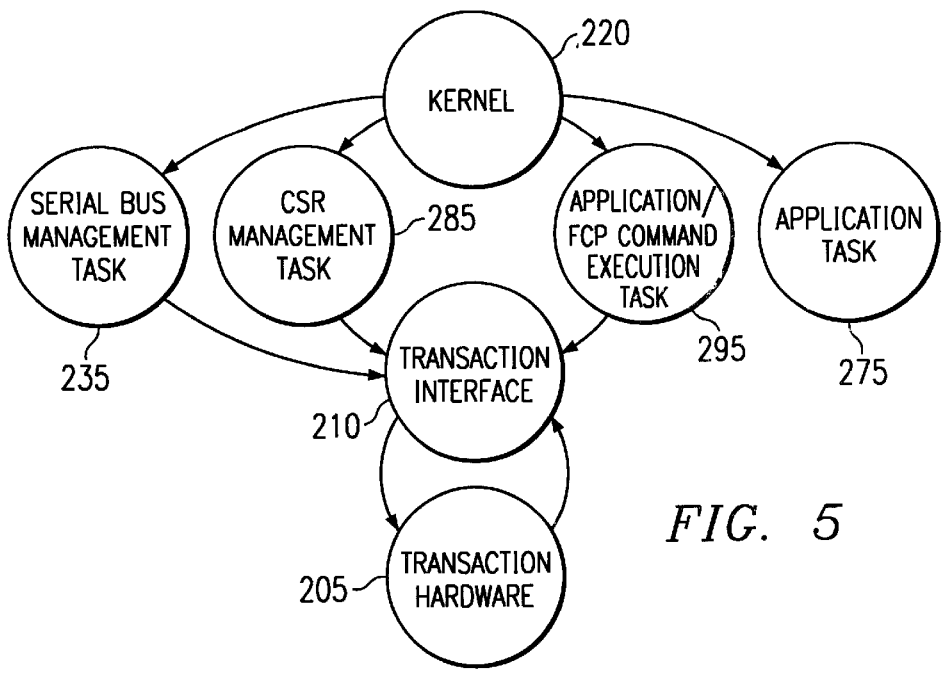
FIG. 5 is a diagram showing services and tasks according to another embodiment of the present invention.

With reference to FIG. 3, the Transaction Interface 210 and Kernel/Scheduler/Dispatcher 220 will be present for all embodiments of the invention. Additionally, one or more tasks will be present, depending on which protocol is used for the transport layer 80 and the application layer 90 shown on FIG. 2. In the embodiment shown in FIG. 3, seven tasks are shown. These tasks are structured to perform functions required when using the SBP-2 protocol for the transport layer 80. The invention is thus scaleable to accommodate any protocol used. For example, the embodiment shown in FIG. 5 shows tasks optimized for the FCP. Thus, one or more tasks can be used to implement any protocol desired.

Referring back to FIG. 3, the seven tasks shown enable the invention to work with the SBP-2 protocol. The Transaction Interface 210 takes different action depending on the transaction code received. For instance, when a write request for a data quadlet or a data block, or a read request for a data quadlet or a data block is received by the Transaction Interface 210, the Transaction Interface performs an ordered set of operations involving scheduling one or more tasks.

Services and tasks shown in FIG. 3 communicate with one another through message control blocks (MCB) placed in queues related to the services and tasks. Each task shown in FIG. 3 has at least one respective associated queue. Information transferred between tasks is only via MCBs. Each specific task has its own type of control block including data specifically needed by that task to operate. Shown in FIG. 3 are seven tasks, a Command ORB Execution Task 245 which uses a command message control (CMC) block, a Fetch Management Task 215, which uses a fetch management message control (FMC) block, an ORB Fetch Task 255, which uses an ORB fetch message control (OMC) block, an Unsolicited Status Task 265 which uses an unsolicited status message control (UMC) block, a Management Agent Task 225 which uses a management agent message control (MMC) block, a Serial Bus Management Task which uses a Serial Bus Message Control (SMC) block, and an Application Task 275 that uses an application message control (AMC) block. The services also have MCB's specifically for them. The Dispatcher 220 uses dispatch message control (DMC) blocks and the Transaction Interface 210 uses transaction message control (TMC) blocks. In addition, each task and service has at least one queue into which the respective MCB is placed. For instance, the Management Agent Task 225 has a management agent task queue structured to receive MMC blocks. Nothing in the architecture limits the association of tasks and queues. For instance, one task may have multiple queues or one queue may be associated with multiple tasks. Any degree of association between tasks and queues is possible.

As an example of one type of MCB, FIG. 4 shows a management agent message control (MMC) block. Since every MCB is different, there is no such thing as a standard message control block, however, the MMC block is representative of the types of data contained in MCB's. When a task wants to schedule the Management Agent Task 225, the scheduling task builds an MMC block and places it into an MMC queue. An MMC block 300, shown in FIG. 4, includes 44 bytes of data. Each byte is numbered along the left-hand side for reference and a byte offset numbered 0–15 indicates the individual bits making up the two bytes of each line. Data useful to the task is placed in the MCB as described in FIG. 4. For instance, the speed at which the bus is operating occupies bits 8, 9, and 10 (having an offset of 7, 8, and 9) of the first two bytes of the MMC block. An address for a management operation request block (ORB) is 6 bytes long and includes bytes 4–9. This data is necessary and used by the Management Agent Task 225 during operations.

To schedule a task or call a service from another task, several steps are taken. First, an MCB is created for the particular task or service. Then the MCB is placed into the queue associated with that particular task or service and a return code is sent back to the originating task. Then the originating task checks the return code. If the return code indicates that the MCB is not at the top of the queue, this means that the task is currently running and the originating task does nothing more. No action is taken because once started, a task operates on all of the MCB's in its queue until the queue is empty. Thus, the MCB recently placed in the task's queue will eventually be operated on, when it ascends to the top of the queue. If, however, the return code indicates that the MCB just placed into the task queue is already at the top of the queue, i.e., there are no other MCB's in that task queue, this tells the originating task that the scheduled task is not already running and must be started.

To start a task, the originating task creates a dispatch message control (DMC) block for the Dispatcher 220. The DMC block indicates which task is to be started and what priority is to be given to the DMC block. The Dispatcher 220 includes a related queue that is continuously checked for entries. As entries are received by the Scheduler 220 to start the desired tasks, they are placed into the dispatcher queue according to priority, with the highest priority being placed highest in the queue. As with all of the queues, the dispatcher or task will not be interrupted from operating on its current MCB, even when an MCB having higher priority is placed in its queue. Instead, the Scheduler 220 orders DMC blocks based on priority of the new block and the blocks currently pending in the DMC queue, but not the DMC block currently being operated on. When the DMC block reaches the top of the DMC queue, the Dispatcher 220 looks in the DMC block to see which task is to be called, and then informs the called task that there is an MCB sitting in its own queue waiting to be operated on. That initiates the scheduled task to begin operation. So, in order for one task to schedule another task or call a service to operate, either one or two MCBs must be created. First, an MCB is created specifically for the scheduled task and placed in its associated queue. A return code is then checked by the originating task. If the return code indicates the MCB was placed in the queue but not at the top of the queue, the initiating task does nothing more because the scheduled task is already running and will operate on the MCB when it moves to the head of the queue. If, however, the return code indicates that the MCB was placed at the top of the queue for the scheduled task, a DMC block is generated by the originating task that indicates which task is to be scheduled or service to be called, and what priority is to be given the DMC block. The Scheduler 220 then places the DMC block in the appropriate location in the DMC queue, ordered by priority. When the DMC block reaches the top of the DMC queue, the scheduled task or called service is alerted that there is an MCB in its queue and to begin operation. The desired task or service then begins, returns the DMC block to a free message blocks pool, and then operates on the MCB at the top of its own queue.

A common pool of resources exists for all MCBs. The message block pool is managed by the Kernel 220. The pool consists of a finite memory space from which MCBs can be created. As more MCBs are created, the amount of memory space left in the pool decreases. When no memory space remains in the free blocks pool, no more MCBs can be generated until more resources are supplied. Resources are supplied by returning MCBs back to the pool after they have been operated on and are no longer needed, i.e., when they are removed from the queue. When a task or service is finished using an MCB previously in its queue, it calls the Kernel 220 requesting that the MCB be placed back in the free blocks pool. It then moves the next free MCB to the top of its queue. Additionally, if a DMC block is necessary to start the task or service, the called task or service immediately returns the DMC block to the free memory blocks pool before operating its own MCB. The size of the free memory blocks pool is determined by the amount of memory available, and is fixed before any MCBs are allocated.

In addition to managing the dispatch queue and managing the free message blocks pool, the Kernel/Scheduler/Dispatcher 220 also performs other functions in 1394 bus transactions. The Kernel 220 initializes the data structures, timers, and interrupt vectors. All tasks that are timed require a timer. The Kernel 220 provides such timer management services as starting, stopping, restarting, checking, deleting and providing an interrupt based on the timers. The timers are allocated when requested by a task through a call to the Kernel services. Each timer currently active is adjusted every clock cycle. In one embodiment, a timer is initialized with a given number, which is decremented each clock cycle. When the timer value reaches zero, a notification is sent to the task associated with that timer.

As stated above, the particular tasks chosen to work with the Transaction Interface 210 and the Kernel/Scheduler/Dispatcher 220 depend on the transport layer 80 used in the particular system. In the embodiment shown in FIG. 3, the tasks have been selected to operate with the SBP-2 protocol for the transport layer. When other transport layer protocols are used, other tasks may be present or some of the tasks shown in FIG. 3 may not be present. In this way, the Transport protocol interface 200 is extremely flexible and scaleable, allowing for as much customization as is desired.

As shown in the embodiment shown in FIG. 3, the Command ORB Execution Task 245 operates on data and status transactions between the Application Task 275 and an initiator, typically located at a different node. In operation, the initiator will send data to or receive data from the Application Task 275. The Command ORB Execution Task 245 is the principle throughway for the data and status messages between them. The Fetch Management Task 215 ensures that an operation received at a particular node was intended for that node. If the operation is at the correct node, the Fetch Management Task 215 updates a variable used to indicate a current state of an agent. The ORB Fetch Task 255 receives several ORBs containing commands from an initiator, and passes them to the Application Task 275 to execute. The Unsolicited Status Task 265 sends a status message to the initiator when requested by one of the other tasks. The Management Agent Task 225 performns management-type functions requested by the initiator, including access requests, logging in, setting passwords, etc. The Serial Bus Management Task 235 functions as an interface between the serial bus management 40 on nodes of the 1394 bus and the Application Task 275 for the same node on which the Serial Bus Management Task sits. Finally, the Application Task 275 operates to execute upper protocol commands found in the Application Layer 90 of FIG. 1. The Application Task 275 is the ultimate origination or destination of the majority of data transferred along the 1394 bus.

Turning now to some of the specific instances of the tasks shown in FIG. 3, the Management Agent Task 225 responds to management type requests from an initiator. In response to a management agent CSR write sent by the initiator node, the Management Agent Task 225 fetches a management ORB from the initiator and then executes the ORB function. Examples of ORB functions include login, set password, reconnect, and terminate task. If the Management Agent Task 225 must communicate back to the initiator, it uses the transmitting portion of the Transaction Interface 210.

The Transaction Interface 210, in addition to receiving packets destined for the local node as described above, also prepares packets destined for other nodes. Once prepared, the Transaction Interface 210 transfers the packets to the link layer 20 where they are synchronized and sent to the physical layer 10 for conversion to electrical signals to be placed on the bus. Depending on the type and amount of data to be sent from the Transaction Interface 210, a transmit bay, payload data transmit bay, and/or a Direct Memory Address (DMA) channel may be used. If the amount of data to be sent from the Transaction Interface 210 is large, it may be broken up into several packets to be placed on the bus. Each packet is prepared and then sent along the bus.

Tasks desiring to send data to a node other than the one that they are on send the data through a transmitting portion of the Transaction Interface 210. The Transaction Interface 210 includes at least two queues to hold TMC blocks, one for time critical transactions and one for non-time critical transactions. Data to be sent along the bus are packaged into TMC blocks and placed into the time-critical or non-time critical queue as desired. The non-time critical TMC queue is used for data block transfer requests, whereas the time critical TMC queue is used for transactions that must be split into subactions. It may take multiple transactions to complete a non-time critical TMC block request. Once the transactions are complete, the Transaction Interface 210 sends notice to the task that is sending the data that the task is complete.

Each transaction that is initiated by the Transaction Interface 210 has a software timer associated with it. These software timer services are provided by the Kernel 220 as previously discussed. A retry count field of the TMC block is incremented if the data transmission is unsuccessful. As long as the retry count is below the programmable maximum number of retries, the Transaction Interface 210 will attempt to send the data again. If the maximum retry count has been exceeded, a status message is sent back to the calling task informing it of the failure. At the completion of a transaction, i.e., the Transaction Interface 210 received an acknowledgment from the node to which the data is being sent, the Transaction Interface 210 schedules a transaction completion status or other response data to return to the calling task. The data is placed into a DMC block and sent through the Dispatcher 220 to the calling task.

Returning to the Management Agent Task 225, after the task sends the data to the initiator, the task then becomes suspended pending notification from the Transaction Interface 210. When the Transaction Interface 210 completes the data transaction with the initiator, the transaction interface wakes up the Management Agent Task 225 by making a system call to the Scheduler 220. The Management Agent Task 225 then continues its execution of the management ORB for that task. Once complete, the Management Agent Task 225 discards the MMC block from the top of its queue, calls the kernel to return the MMC block to the free memory block pool, and begins operation on the next MMC block in its queue, if any. If the management ORB contains a login command, the Management Agent Task 225 creates an OMC block and a login descriptor list. The OMC block and login descriptor list are removed after the initiator logs out.

The Application Task 275 represents the application that would be operating at one of the nodes on the 1394 bus, for instance, high speed printers, high speed storage, or audio visual applications. Applications communicate via their native protocols using specific application protocols, such as Reduced Block Commands (RBC) for hard disk drives, Printer Working Group (PWG) for printers, or Internet Protocol (IP) for networks. Several applications can operate at one time on any given node. Each application decodes, validates, and executes commands delivered to it. Each separate application has a separate queue, identified by a number based on how many applications are running.

The ORB Fetch Task 255 functions to retrieve multiple command ORBs from one initiator at a time, passing the encapsulated commands to the Application Task 275 for execution. For every new fetch, a system call is made to determine the AMC block address requesting the fetch. This block address is then saved in the OMC block corresponding to the initiating task. The ORB address is retrieved from the OMC block. Then, the Transaction Interface 210 is scheduled to read and return the command ORBs. If the data comes back without error, an AMC block is generated and placed into the AMC queue, sending the retrieved data to the proper application task. Depending on how many initiators are present, the ORB Fetch Task 255 may limit the total number of ORBs in each fetch in order to provide fairness arbitration.

The Command ORB Execution Task 245 provides for data transfer requests and status delivery on behalf of the Application Task 275. The Command ORB Execution Task 245 retrieves the command it is to execute from the command message control (CMC) block that was placed in a CMC queue by the Application Task 275. The Command ORB Execution Task 245 schedules the Transaction Interface 210 to send or retrieve the data or status as directed. Once complete, the Transaction Interface 210 wakes up the Command ORB Execution Task 245, which then notifies the particular Application Task 275 for which it is working, of the status of the ORB execution or provides the requested data.

The Fetch Management Task 215 processes two special write requests. In either case, the Fetch Management Task 215 updates a field in an OMC block.

Finally, the Unsolicited Status Task 265 operates to send a status signal to initiators at another node, even if not requested. This task would operate to notify the initiators that were logged in before resetting the node, for instance.

An important feature of the invention is that each of the tasks described above operates according to a predetermined series of instructions. The tasks, depending on their complexity, may include one or a multitude of logic states. Each state represents a temporary stopping place for the task. Each task can be thought of as a sequential circuit whose behavior is determined from the current data (contained in its MCB) and the present state of the task. Depending on new data received after entering a state, a task that is in one state will change to a different state. It is also possible for the state, after receiving the new data, to remain in its present state until even more data is acquired by the task.

The operation of a sequential circuit, such as the tasks described above, can be described using a state table or a state diagram. A state table lists the present state of a sequential circuit and the conditions for it to proceed to a next state. Unless the conditions are met, the sequential circuit does not change states. An example of a state table is shown in FIGS. 10A–10D, which show the states for the Management Agent Task 225, as described below. Similarly, the different states of a sequential circuit can be shown in a state diagram, for example FIG. 6 that shows the different states of the Command ORB Execution Task 245. In these state diagrams, generally, stable states are shown as circles and conditions to change from one state to another are shown as arrows. Also, some indication is typically used to denote the initial state of the sequential machine. In this case, initial states are indicated by a double circle.

Figure 6:
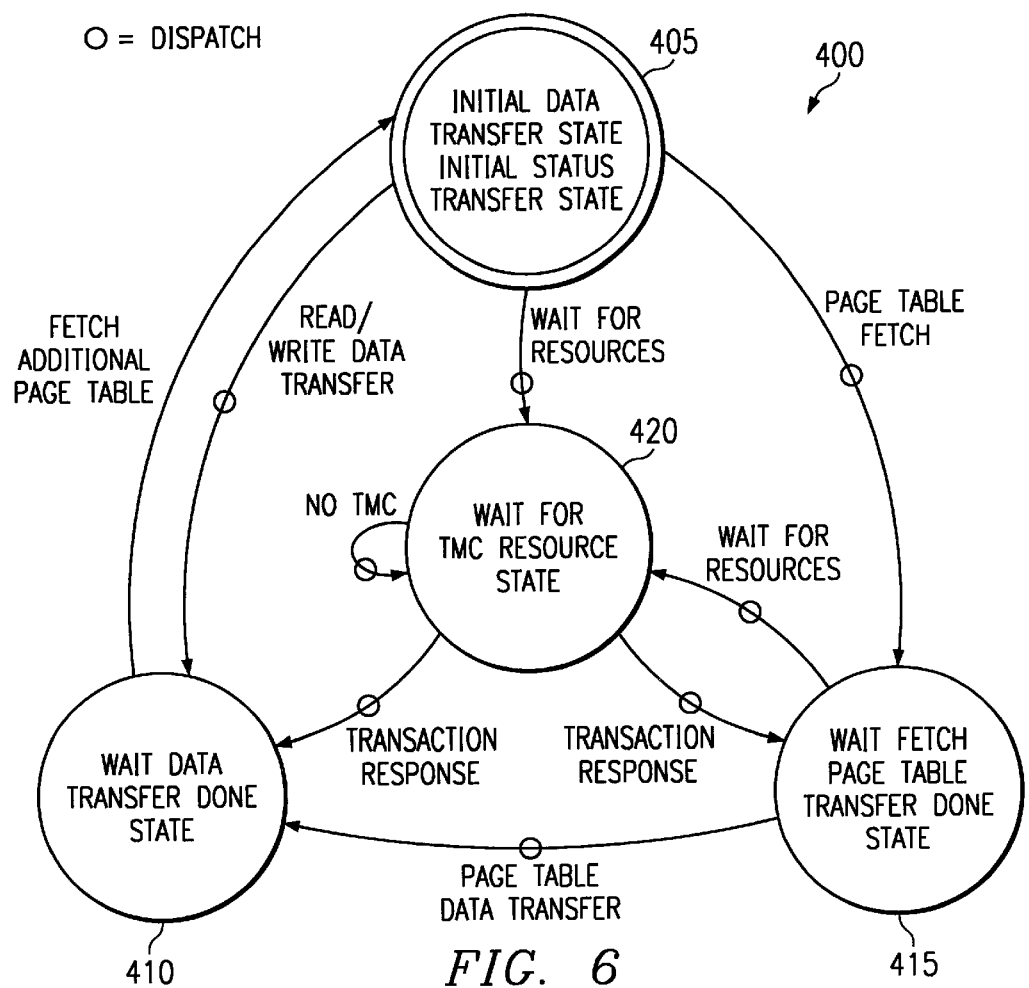
FIG. 6 is a state diagram showing the states of the Command ORB Execution task.

FIG. 6 shows the state diagram 400 for the Command ORB Execution Task 245, introduced in FIG. 3. As described above, circles on the diagram indicate steady states, and arrows show conditions needed to change states. Also as described above, the initial state is shown as a double circle. For the Command ORB Execution Task 245, the initial data state is referenced as 405.

As described above, the Command ORB Execution Task 245 generally operates on data and status transactions between the Application Task 275 and an initiator, normally located at a different node of the 1394 bus. As previously described, the Command ORB Execution Task 245 is called by the Application Task 275 by formatting a CMC block and queuing it into the Command ORB Execution Task's queue. When that particular CMC block is at the head of the queue, the Command ORB Execution Task 245 enters the initial state 405. This is both the initial data transfer state and the initial status transfer state, as shown in FIG. 6.

The first determination the Command ORB Execution Task 245 must make is whether the CMC block contains a data transfer or a status transfer operation. This information is contained in the CMC block and is simply decoded by the Command ORB Execution Task 245. If the Command ORB Execution Task 245 has been called for a data transfer, more information must be analyzed from the CMC block to determine which state to next go to. If the data in the CMC block indicates that a page table fetch is required, the Command ORB Execution Task 245 will perform a page table fetch and then change to a state 415. If, however, no page table fetch is necessary, the command ORB execution task begins transferring data, and will directly proceed to a state 410. A page table fetch is required if memory resources are fragmented or not available in large blocks, as is known in the art. A page table fetch is accomplished by the Command ORB Execution Task 245 requesting a TMC block, filling it with data necessary to perform a read block request and then queuing the TMC block into the queue for the Transaction Interface 210. It is necessary to perform a read block request because the Command ORB Execution Task 245 must request data, in the form of a block, from the initiator. This block will contain the page table data necessary to perform the data transfer of the Command ORB Execution Task 245. A circle noted on the arrow between two states, for example between states 405 and 415, indicates that an appropriate MCB must be prepared and one of the other tasks or services is called through the Dispatcher 220. If TMC resources are not available, i.e., all of the memory space for memory resources has been allocated by the Kernel 220, the Command ORB Execution Task 245 enters a state 420, where it waits for the appropriate resources. In most of the states, the task is suspended from further operation until additional or different data is provided to the task.

A suspended state means that the MCB currently at the top of the queue for the suspended task remains at the top of the queue. The suspended task will stay suspended until wakened up by the Kernel 220 or until the task times out. While in the suspended state, the suspended task starts a countdown timer. After a given period of time, the timer is decremented until the timer reaches zero. Once the countdown timer has reached zero, an error condition is generated. This error is reported to the task that called the task that timed out and may be stored in an error log, as is known in the art. If the error is not catastrophic, the task that timed out will remove the MCB currently at the top of its queue, and begin operation on the next highest MCB.

Turning back to FIG. 6, once the page table has been fetched in the state 415, the Kernel 220 will wake up the Command ORB Execution Task 245. This is done by scheduling the task to become operative, then the Kernel 220 calling the task. The Command ORB Execution Task 245 remembers the state it was in when it was suspended. Once the page table is fetched, the Command ORB Execution Task 245 requests the desired block of data from the location indicated in the page table. This step is shown as the arrow between the states 415 and 410. As above, this operation includes requesting a TMC block, filling the TMC block with data, and queuing the TMC block into the appropriate queue for the Transaction Interface 210. Also as above, because this utilizes the Dispatcher 220, the arrow between the states 415 and 410 contains a circle. If no memory resources are available for the TMC block, the Command ORB Execution Task 245 enters the state 420 where it waits for such resources.

The Command ORB Execution Task 245 enters the state 410 after a data transfer following a page table fetch, if entering the state 410 from the state 415, or after performing a read/write data transfer, if entering state 410 from the state 405. While in the state 410, the command ORB execution task determines if it has any additional data to transfer. There will be additional data to transfer if the size of the data requested to be transferred by the Application Task 275 is larger than the largest data block that can be attached to an asynchronous data packet, as described above. From the state 410, the Command ORB Execution Task 245 can return to the calling task, or, if it is determined that another page table fetch is necessary, proceed back to the initial state 405 to begin the process again. If another page table fetch is necessary, the state 415 is entered through state 405, as described above. Once the Command ORB Execution Task 245 completes its data transfer, the task returns to the calling task from state 410.

The Command ORB Execution Task 245 can also be responsible for sending a status transfer. If a status transfer is requested, a TMC block is requested and filled with the appropriate data. The TMC block is then queued in the queue for the Transaction Interface 210. If no conformation that the status transfer is requested by the calling task, the Command ORB Execution Task 245 has completed the function and returns to the calling task. If, instead, a conformation of the status transfer was requested by the calling task, the Command ORB Execution Task 245 proceeds to the state 410 to wait for the confirmation. Once conformation comes back from the Transaction Interface 210, the Command ORB Execution Task 245 returns to the calling task. As above, if memory resources are not currently available to allocate a TMC block, the Command ORB Execution Task proceeds to state 420 where it waits for such resources. Once available, the status is then sent through the Transaction Interface to the desired node on the 1394 bus.

By having each task operating as a state machine with a number of states, including several suspended states for some of the tasks, the Transport Protocol Interface 200 can perform multiple tasks at once, i.e., multitask. While a portion of a particular function is held in a suspended state, typically because data is needed from another node on the 1394 bus, other portions of the current function or even another function altogether can be operated on by one of the other tasks. This way, more than one function can be performed at the same time by the Transport Protocol Interface 200. Additionally, by having suspended states, the Kernel 220 is free to perform other tasks, which makes for improved system performance. Because the tasks are driven by state machines, processor time is optimized in fairly distributed among the tasks.

Figure 7:
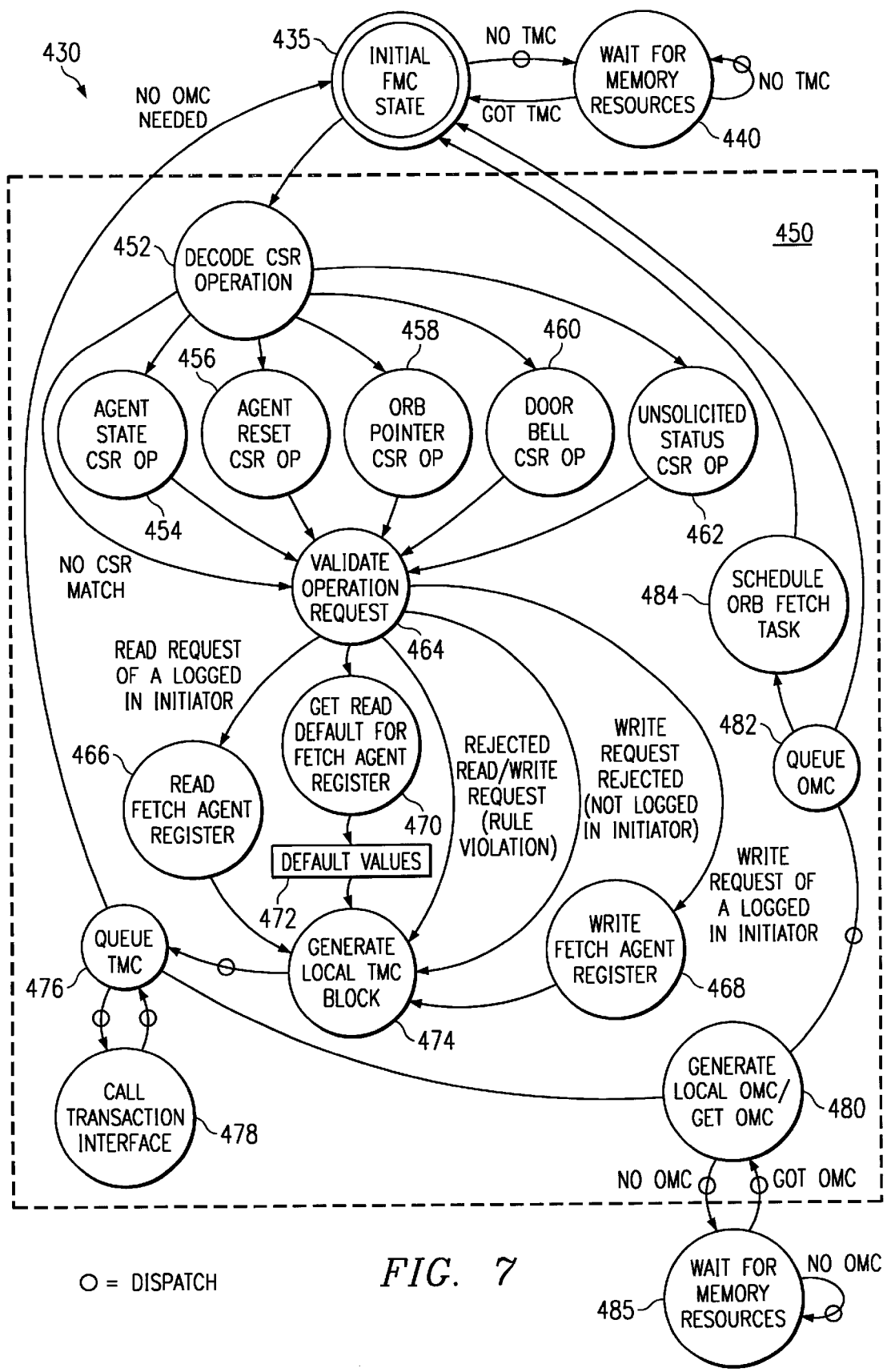
FIG. 7 is a diagram showing the states and execution flow of the Fetch Management task.

FIG. 7 shows a state diagram 430 for the Fetch Management Task 215. Additionally shown in FIG. 7 is an execution flow 450 for the Fetch Management Task 215, as described herein. The Fetch Management Task 215 is called by the Serial Bus Management Task 235 if one of the registers are to be accessed, as discussed below. Additionally, the Management Agent Task 225 calls the Fetch Management Task 215 for abort and reset conditions. Finally, the Transaction Interface 210 is able to call the Fetch Management Task 215 if directed by a separate node on the 1394 bus.

The initial state in the state diagram 430 is a state 435. Because it is sure that the Fetch Management Task 215 will eventually call the Transaction Interface 210, a TMC block is immediately requested from the Kernel 220 before other operations in the Fetch Management Task 215 are performed. If memory resources are not available, the Fetch Management Task 215 enters state 440 to wait for such resources. Once the resources are available for the TMC block, the Fetch Management Task 215 enters the execution flow 450, delineated by a doted outline. Within the execution flow 450 events as they occur within the Fetch Management Task 215 are indicated. These fin events are not states of a state machine per se, but rather indications showing the program flow of the Fetch Management Task 215. Initially, a step 452 is where the Fetch Management Task 215 decodes a CSR operation that is taken from the FMC block. As described above, the FMC block that the Fetch Management Task 215 is currently working on was queued in the associated queue for the Fetch Management Task.

Once the CSR operation is decoded in the step 452, the Fetch Management Task 215 determines which CSR is being accessed, based on its memory location. The CSR operation can access one of a number of registers, for example, it can be a CSR operation for the agent state CSR 454 the agent reset CSR 456, the ORB pointer CSR, 458, the doorbell CSR, 460 or the unsolicited status CSR 462. It is also possible that the CSR will not match a particular memory location as shown by the arrow going directly from step 452 to a step 464. In that step, the operation request, for example a read or write request, is validated to determine whether the initiator of the request has logged into the host. If the operation is a read request of a logged-in initiator, the fetch agent register is read in a step 466. If the operation request is a write request from a logged-in initiator, the fetch agent register is written in a step 468. If the operation is a valid read request however the host is not logged-in, a read default will be provided to the requester, including the default values as depicted in box 472. These default values are prescribed by a particular transport protocol being used, for instance in the SBP-2 transport protocol the default values for a valid read request from a requester that is not logged-in will be all zeros. If, at step 464, the read write request is rejected due to a rule violation, for example, an initiator is attempting to write into a read only memory location or read from a write only memory location, the execution flow 450 of the Fetch Management Task 215 goes to an operation 474, described below. Additionally, if an initiator that is not logged-in attempts to perform a write request, the Fetch Management Task 215 will reject that request and move the execution flow directly from the step 464 to 474. Once in step 474, the read or write agent registers, or the error message if the read or write request was rejected, will be packaged into the TMC block that was requested initially by the state 435. That TMC block is then placed in the queue of the Transaction Interface 210 at a step 476.

As before, if the Fetch Management Task 215 receives notification that the TMC block it just queued is at the head of the queue for the Transaction Interface 210, that means the Transaction Interface is not currently running. Therefore, if the Transaction Interface 210 is not currently running, the Transaction Interface is scheduled through the Kernel 220 at a step 478. From the step 476, after the TMC block has been queued into the TMC queue, a determination is made as to whether or not the fetch engine from the ORB Fetch Task 255 must be started or restarted. If no action is needed regarding the ORB Fetch Task 255, the Fetch Management Task 215 returns from the step 476 of the execution flow 450 directly back to the initial FMC state 435. If, however, the ORB Fetch Task 255 must be started or restarted, an OMC block must be generated as indicated in step 480. As before, if no memory resources are available to create the OMC block, the Fetch Management Task 215 enters a state 485 where it can wait for the proper memory resources. Once the Fetch Management Task 215 has the proper memory resources, the OMC block is queued at a step 482. As usual, if the Fetch Management Task 215 receives notification that the ORB Fetch Task 255 is not already running, the ORB Fetch Task is scheduled in a step 484. When, the Fetch Management Task 215 returns from its execution flow 450 back into the initial FMC state 435, it checks its own queue to determine whether to continue running or not. If there are no entries in the queue for the Fetch Management Task 215, the Fetch Management Task will shut down. If, however, there are additional entries in the queue for the Fetch Management Task 215, the next entry is decoded and the process for the Fetch Management Task 215 begins again in the initial FMC state 435.

Figure 8:
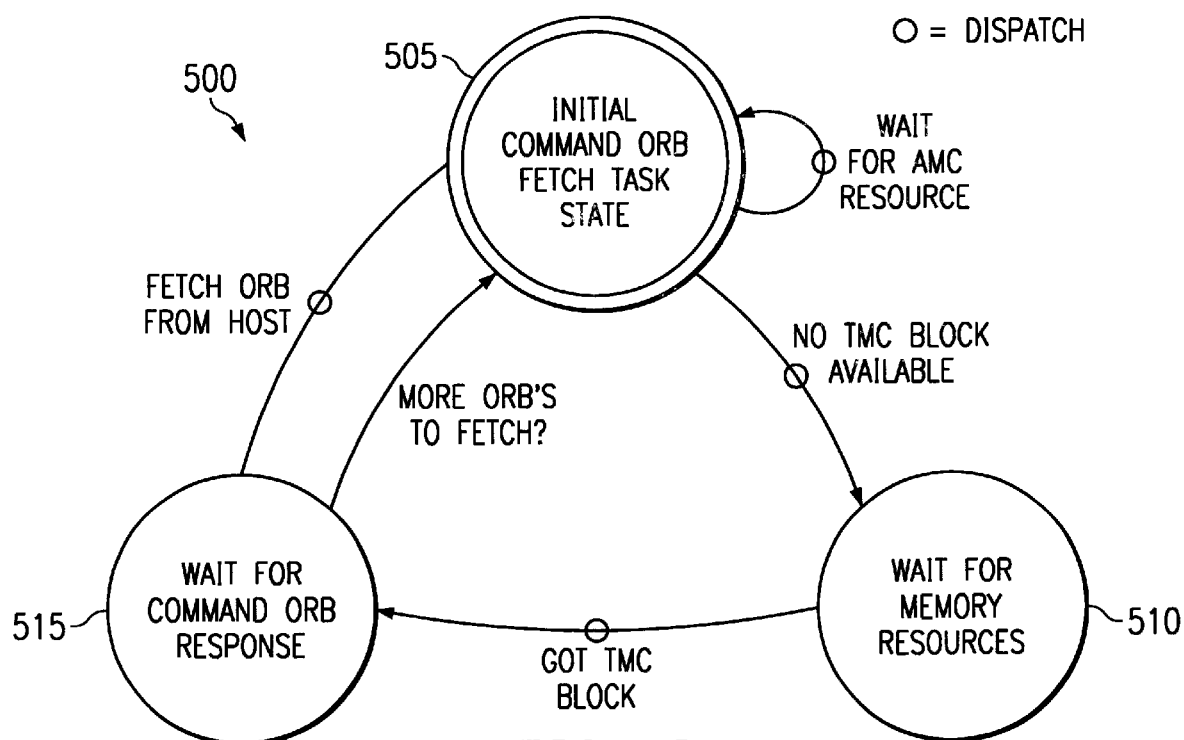
FIG. 8 is a state diagram showing the states of the ORB Fetch Task.

FIG. 8 shows a state diagram 500 for the ORB Fetch Task 255. As described above, the ORB fetch task 255 retrieves multiple command ORBs from one initiator at a time, and passes the encapsulated commands to the particular Logic Unit Number (LUN) operating within the Application Task 275. The ORB Fetch Task 255 begins in an initial state 505. Its first action is to determine the AMC block address requesting the command ORB fetch. If no AMC resources are available, it must wait for them to become available before operation begins. Once the block address is known, a TMC block is created asking for the command ORB to be retrieved from the initiator. As above, if no TMC resources are available, the ORB Fetch Task 255 moves to a state 510 to wait for those resources. Once the resources are available, the ORB Fetch Task 255 proceeds to a state 515 where it waits for a command ORB response. In the state 515, if the command ORB response is successful, and no further command ORBs are sought to be retrieved, the ORB Fetch Task 255 can leave from this state 515. If however there are more ORBs to fetch, the ORB Fetch Task 255 proceeds back to the initial state 505 to fetch more ORBs and the process continues.

The queue for the ORB Fetch Task 255 is unique in that it is circular. To allow for fairness arbitration, so that no one LUN within the application task monopolizes the resources of the transport protocol interface 200, there is a maximum number of command ORBs that are allowed to be fetched at any one time. This number is programmable, and is typically set to a fairly small number, for example, three, so that no LUN ties up the system for itself to the exclusion of other LUNs. If an OMC block originally requests, for example, ten command ORBs, the ORB Fetch Task 255 would fetch three of the command ORBs in its initial operation. That OMC block, with seven outstanding command ORB requests would then be moved from the top of the queue to the bottom of the queue so that other OMC blocks may be operated on. In total, the OMC block that requested ten command ORBs would enter the initial state 505 of the ORB Fetch Task 255 a total of four times; in each of the first three times, three command ORBs would be fetched, and the fourth time only one command ORB would be fetched. Once fetched, the ORB Fetch Task 255 will be in state 515. As described above, if there are no further command ORBs to fetch, the ORB Fetch Task 255 returns to its calling task directly from the state 515.

Figure 9:
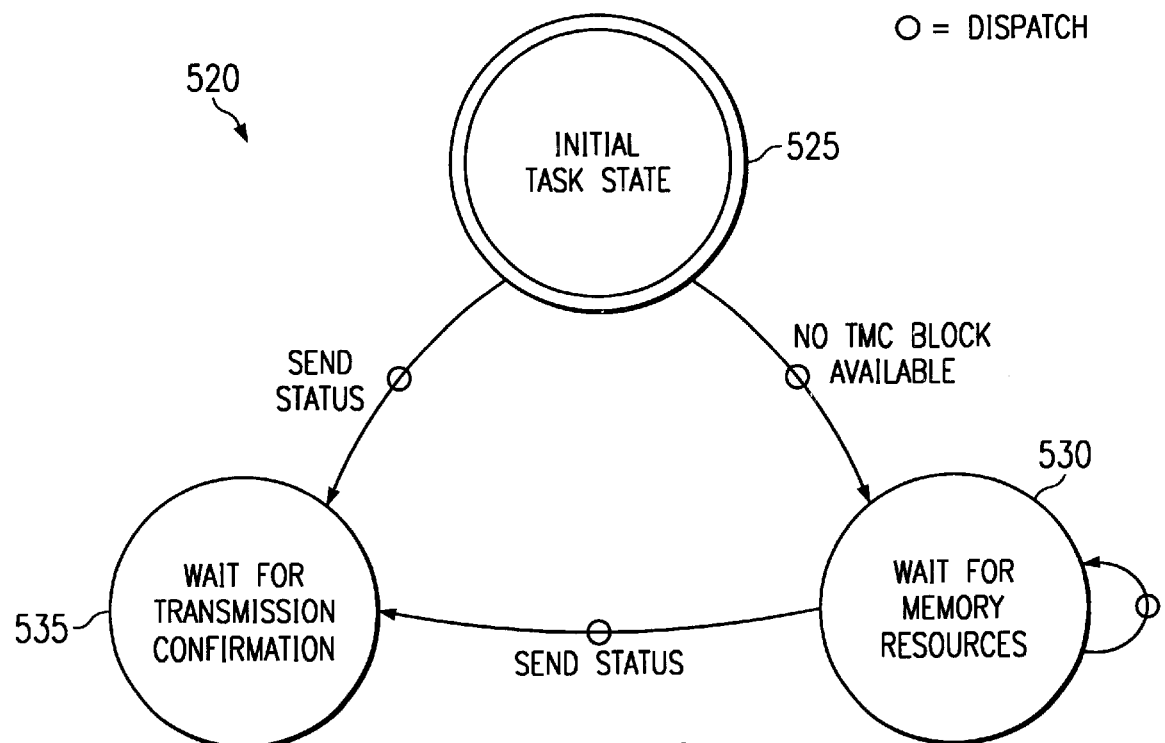
FIG. 9 is a state diagram showing the states of the Unsolicited Status Task.

FIG. 9 shows a state diagram for the Unsolicited Status Task 265. As described above, this task sends a notification to initiators that the application, or the node itself upon which the Transport Protocol Interface 200 sits, is being shut down. A state diagram 520 shows that the Unsolicited Status Task 265 has an initial state at 525. The operation of the Unsolicited Status Task 265 is to write data into memory of a host. Therefore, a TMC block must be generated including this data to be sent along the 1394 bus to the host's memory. As usual, if no memory resources are available to generate a TMC block, the Unsolicited Status Task 265 proceeds to a state 530 where it waits for memory resources. Once the TMC block is available, the status is sent and the Unsolicited Status Task 265 enters a state 535 where it waits for confirmation that the status was transmitted along the 1394 bus without error. Once the Unsolicited Status Task 265 is notified that the status task was sent without error, the Unsolicited Status Task exits from state 535 and returns to its calling task.

FIGS. 10A–10E show a state change decision table 550 for the Management Agent Task 225. The current state that the Management Agent Task 225 is in is shown on the left-hand side while the next state that the Management Agent Task 225 will be in is shown on the right-hand side of the decision table 550. States are separated from one another in the state change decision table 550 by a bold line. Near the top of the state change decision table 550 are conditions that must be met in order for the Management Agent Task 225 to change from its current state to the next state.

As described above, the Management Agent Task 225 handles management requests from an initiator, including access requests and task management requests. Generally, as depicted in FIG. 4, the MMC block contains a management ORB or a task ORB. The initiator that sent the management ORB or task ORB expects a response back saying that the Management Agent Task 225 has received the ORB. Therefore, the initial state of the Management Agent Task 225 is a "management agent write" state as shown in the state change decision table 550 of FIG. 10A. The management agent write state is the top-most state. Additionally, there is an x in the box under the condition "send ORB write response." The state change decision table 550 provides the information that if the Management Agent Task 225 is in the management agent write state and the condition send ORB write response is met, the next state will be "wait for ORB write response." In one embodiment of the Management Agent Task 225, the condition of send ORB write response is always set so that when the Management Agent Task 225 enters its initial state, it will always send an ORB write response.

As with the previous tasks, if there are no free memory resources, indicated on the state change decision table 550 as the condition "no free TMC block", the next state for the Management Agent Task 225 will be "wait for TMC resource." There are two other ways to leave the management agent write state. If there has been a split transaction timeout and there is another MMC block available, the Management Agent Task 225 will discard the current MMC block and go to the next MMC block in its queue. A split transaction timeout occurs when the Management Agent Task 225 does not receive notice that the data being written to the initiator was received by the initiator without error. Since, in this state, the Management Agent Task 225 was only sending a response indicating that it received the ORB, it is not necessary to take further action regarding this error, although it may be indicative that there are problems on the 1394 bus. The fourth way to exit the management agent write state of the Management Agent Task 225 is if there is a split transaction timeout but no further MMC blocks are available in the queue. When these conditions are satisfied, the Management Agent Task can do nothing more, and returns to the Kernel 220.

The next state shown on the state change decision table 550 is "wait for ORB write response." If the Management Agent Task 225 is in this state and the condition is satisfied to "fetch a management ORB from a host", the next state entered is "wait for ORB fetch", described below. As above, if no free TMC block is available, the next state will be wait for TMC resource. Also similarly to above, if the condition "transaction completed with error" is satisfied and there are more MMC blocks available in the queue for the Management Agent Task 225, the Management Agent Task discards its current block and begins operating on the next one. The condition "transaction complete with error" would occur, for instance, if the Management Agent Task 225 tried to send a request for an ORB but failed. The last way to exit from the wait for ORB write response state is if the transaction completed with an error but there are no more MMC blocks available, in which case the Management Agent Task returns to the Kernel 220.

As seen from the state change decision table 550, there are similarities in the "next state" for a number of the states. Because they have been adequately described above, for the interest of brevity the transitions to the "wait for TMC resource", "management agent write" and "(done)" states will not be again described for the remainder of the states of the Management Agent Task 225, but rather referred to as the standard state transitions.

Figure 10A:
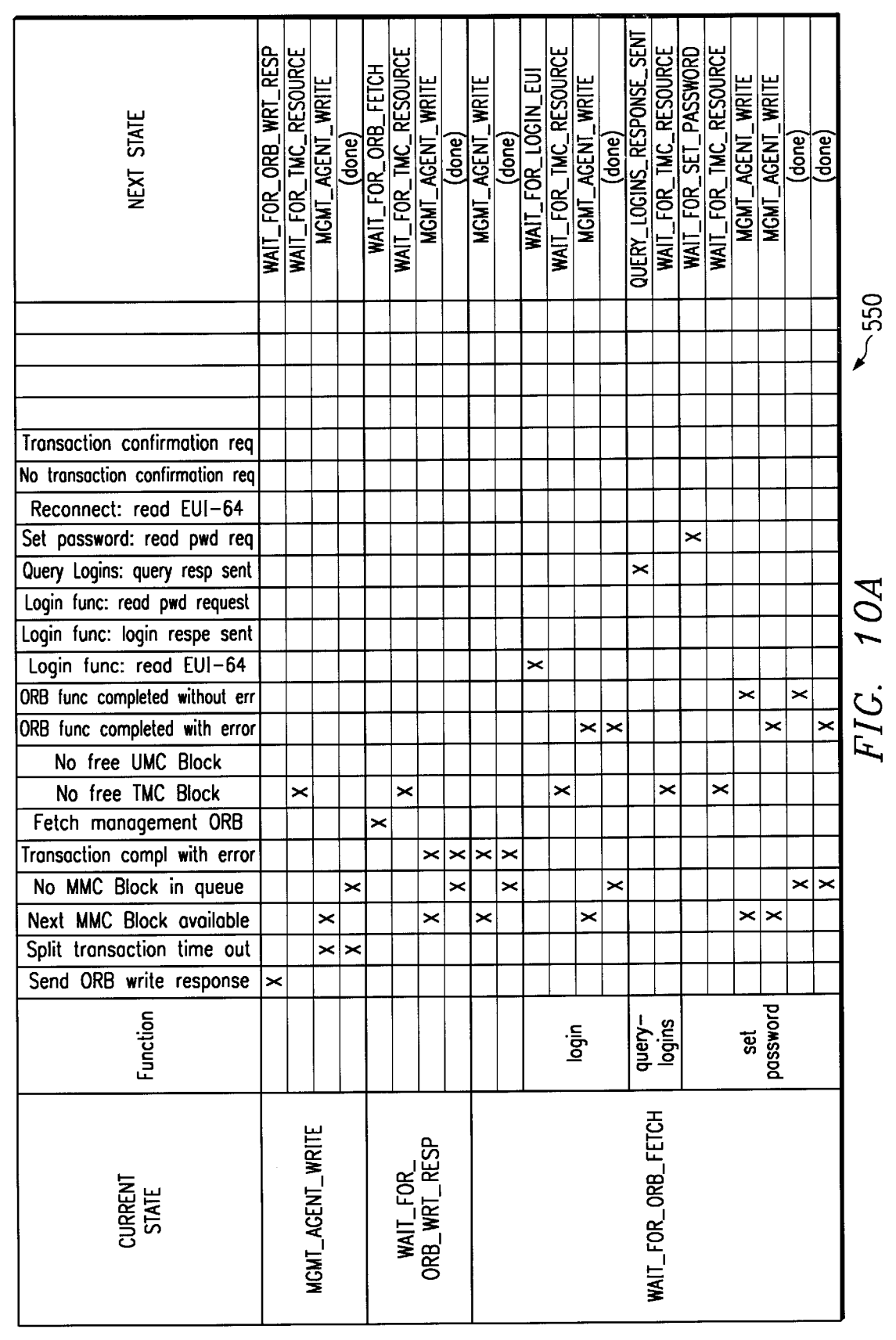

The third state shown in the state change decision table 550 on FIG. 10A is the "wait for ORB fetch" state. This state will be entered by the Management Agent Task 225 once it has requested an ORB fetch from the ORB Fetch Task 255. The standard state transitions apply, with the exception of wait for TMC resource. The state "wait for ORB fetch" in the state change decision table 550 covers most of FIG. 10A, all of FIG. 10B and most of FIG. 10C. This state, however, is broken into a number of functions that are possible to be decoded from the ORB upon its return from the host. Once the ORB returns from the host, the Management Agent Task 225 sends a status back to the host indicating that the Management Agent Task has received the ORB. After the Management Agent Task 225 decodes the ORB it is analyzed to see if it contains a function, and if so, which function. If it contains the "login" function and the condition indicates that "an EUI-64 is to be read from the host", the next state the Management Agent Task 225 enters is "wait for login EUI." The EUI-64 is a login identifier that the host maintains. The standard state transitions apply to the login function of the wait for ORB fetch state.

If the function decoded from the ORB is "query-logins", a response is sent back to the host, and the next state is "query logins response sent." As always, if there is no free TMC block, the next state is wait for TMC resource.

If the function decoded from the ORB is "set password" and the condition "read password request" is set, this indicates that the host desires to change a password, so that the Management Agent Task 225 proceeds to the "wait for set password" state. If the ORB function completed, but had an error, for instance, the password was in the wrong format, the management agent task will move to the next available MMC block, if any. The same result happens if the ORB function completed without an error.

The last function shown in FIG. 10A is "logout." A simple response is all that needs to be sent for this function. Therefore, there are no other states that the Management Agent Task 225 can proceed to other than the standard states.

In FIG. 10B, the function "reconnect" is sent after the 1394 bus resets. For this function, the Management Agent Task 225 will reread the EUI-64 from the host. The standard state transitions also apply. The next function is "terminate." The Management Agent Task 225 merely sends a status back in response to this function and the standard state transitions apply. The next function is "abort task" and is related to the remaining functions shown in FIG. 10B: "abort task set" and "clear task set." Therefore, these functions will be reviewed together. When an abort command is received by the Management Agent Task 225 and decoded from the management ORB, a notice is sent by the Management Agent Task 225 to the Application Task 275 to remove the ORB from the application task. This does not require another state transition however, and is part of the execution flow of the Management Agent Task 225. With the functions abort task and abort task set, nothing further is done, and there are no next states aside from the standard next states. With the clear task set function, the Unsolicited Status Task 265 is invoked to send a message to the host. If there is no free UMC block, the next state of the Management Agent Task 225 is "wait for a CTS UMC block."

The next function, shown in FIG. 10C is a "logical unit reset." The Application Task 275 comprises more than one logical unit. Since the hosts must be told that the logical unit was reset, the Unsolicited Status Task 265 is utilized. If there are no free UMC blocks, the next state becomes the "wait for logical unit reset UMC block." The other states for the logical unit reset function are the standard states.

If the function decoded from the command ORB is a "target reset", all of the logical units for one specific target are reset. This is similar to the logical unit reset, but is broader in scope. The standard state transitions apply, with the addition of a state "wait for target reset UMC block", if no UMC blocks are available.

The next current state of the management agent task, shown in FIG. 10C is "wait for login EUI." This state was entered from the login function of the wait for ORB fetch state, shown in FIG. 10A. If the "login response sent" condition is met, the next state for the Management Agent Task 225 is "login response sent." If the condition exists to read a password request, the next state becomes "wait for login password." The remainder of the states are standard.

The next state shown in FIG. 10C is "login response sent." In this state, the Management Agent Task 225 sends an acknowledgement back to the host as a form of handshaking. Only the standard next states are used.

The last current state shown in FIG. 10C is "wait for login password." If the "login response sent" condition is met, the next state is the "login response sent" state, described immediately above. The remainder of the state transitions are the standard states.

The first state illustrated in FIG. 10D is the "query logins response sent" state. With this state, the Management Agent Task 225 simply sends a status back to the requester. Only the standard state transitions apply.

The remainder of the current states illustrated in FIG. 10D are all states where the Management Agent Task 225 is waiting for something to be returned. For the current states "wait for set password", "wait for reconnect EUI", and "wait for TMC resource", only the standard state transitions apply, and therefore nothing further need be explained. For the states "wait for CTS UMC", "wait for LUR UMC", and "wait for TR UMC", the only state transition in addition to the standard transitions is that of waiting for a UMC block, as described above.

The current state shown in FIG. 10E is "wait for TMC resource", carried over from FIG. 10D. In that state, if a transaction confirmation has been requested, the confirmation request is sent and the next state is the state immediately subsequent to the one that entered the "wait for TMC resource" state.

Figure 11:
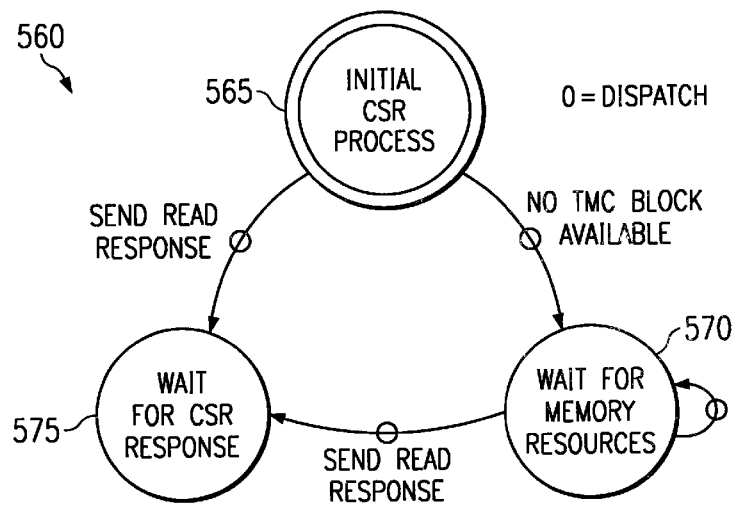
FIG. 11 is a state diagram showing the states of the Serial Bus Management Task.

Next, the Serial Bus Management Task 235 is explored. As described above, the Serial Bus Management Task 235 functions as an interface between the serial bus management 40 of FIG. 2 and the Application Task 275 on the same nodes. A state diagram 560 for the Serial Bus Management Task 235 is shown in FIG. 11. An initial state 565 begins the CSR process. The CSR process is invoked when a host tries to read a CSR register. The Serial Bus Management Task 235 sends a read response to the host including this data. As typical, the initial state 565 attempts to secure a TMC block. If no TMC block is available, a state 570 is entered until a TMC block is received. Once the TMC block is received and filled with the appropriate data, a state 575 is entered. This state can also be entered directly by the initial state 565 provided a TMC block was originally available. In the state 575, the Serial Bus Management Task 235 waits for the appropriate response from the Transaction Interface 210, indicating that the CSR read response was received by the host. Once the Serial Bus Management Task 235 receives an indication that the CSR read response has been received, it returns to its calling task, directly from the state 575.

Figure 12:
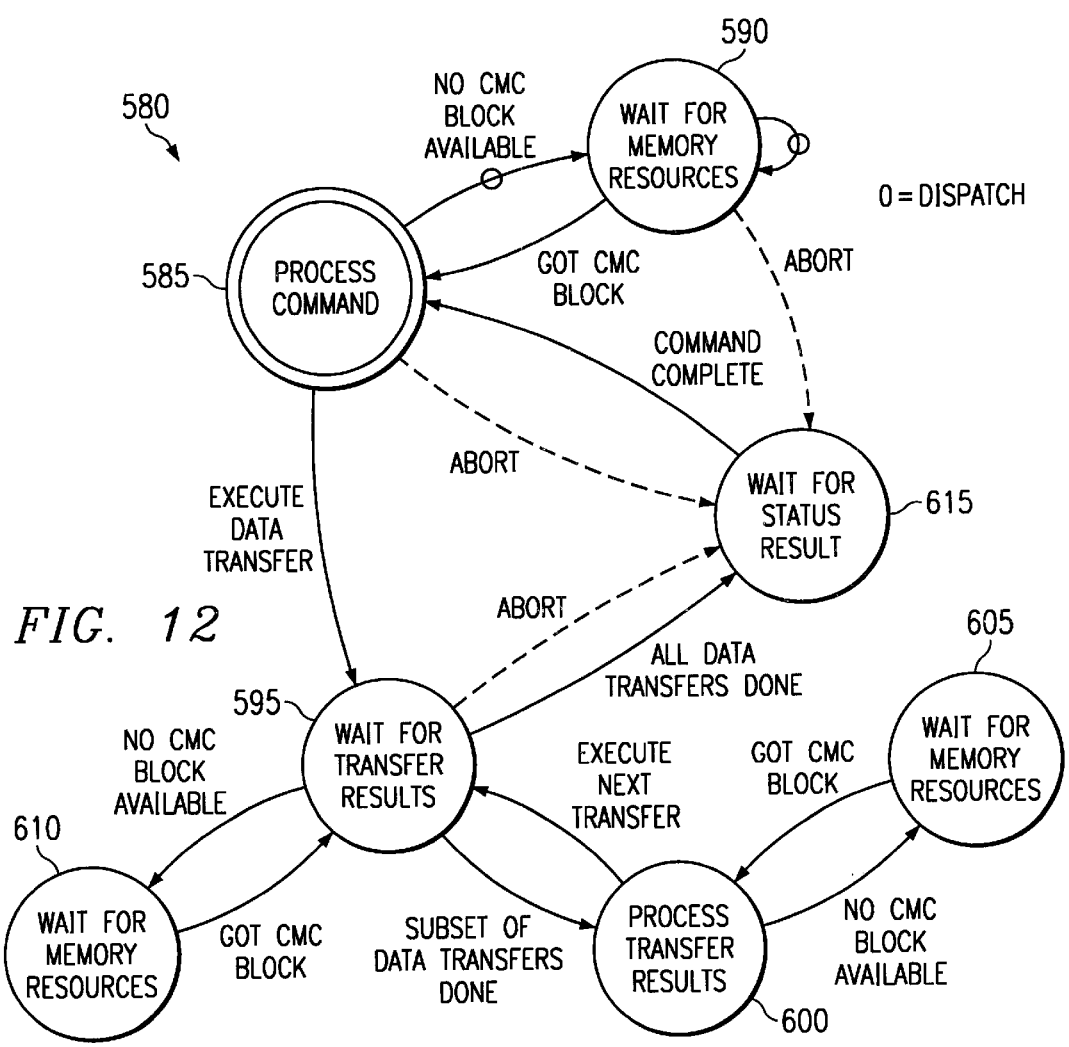
FIG. 12 is a state diagram showing the states of the Application Task.

FIG. 12 shows a state diagram 580 of the Application Task 275. Within the Application Task 275, the state diagram 580 is repeated for every LUN contained within the Application Task 275. As described above, the Application Task 275 receives high level commands, and executes them. The Application Task 275 uses the Command ORB Execution Task 245 to send data and status transfers to other nodes on the 1394 bus.

An initial state of the state diagram 580 is a state 585. In that state, a command that was delivered by the ORB Fetch Task 255 is processed. If the command is a valid command, the data is sent to the initiator through the Command ORB Execution Task 245. This requires a CMC block. If no memory resources are available, the Application Task 275 proceeds to a state 590 where it waits for memory resources. Once the CMC block is available, the data is transferred and the Application Task 275 proceeds to a state 595, where it waits for status of the data transfer. Once each subset of the data transfer is complete, the Application Task 275 changes to a state 600, where the transfer results are processed. If further data transfers are necessary, they are sent via the Command ORB Execution Task 245, for which the requisite CMC block must be obtained. If no memory resources are available, the Application Task 275 moves to a state 605 until they are available. Then the next transfer is executed and the Application Task 275 returns to the state 595 to wait for the transfer results. Once all of the data transfers are complete, a status is sent to the initiator from the state 595. As this step also requires creation of a CMC memory block, if none are available, the Application Task 275 changes to a state 610 until a CMC block is available. Once the status has been sent, a state 615 is entered where a status result is awaited. If an error results, the Application Task 275 ceases operation, but if the result is satisfactory, the command is completed and the initial state 585 is entered once more, to operate on another AMC block at the top of the queue for the Application Task 275.

Shown via dotted lines from the states 585, 590, and 595 are indications of what the Application Task 275 will do when directed to abort by the Management Agent Task 225. When the Management Agent Task calls the abort function of the Application Task 275, the Application Task immediately proceeds to the state 615 where it awaits the status result. The Application Task 275 will abort from this state.

An example of the 1394 bus architecture in operation provides further understanding of the interoperation of the services and tasks. An example utilizing several of the tasks is an act of logging into the host via a management login ORB. This would occur, for example, when a printer is plugged into the 1394 bus. With reference to FIG. 3, the login begins with an initiator on a non-local node. The initiator sends one or more data packets to the Transaction Interface 210 on the local node, where it is received and decoded by the hardware receiving bay. The Transaction Interface 210 decodes a transaction code from the packet and decodes it to see that the initiating task requests data to be written at a destination address found on the local node (logging in to the host). This particular operation is a write management agent operation and first uses the Management Agent Task 225.

The Transaction Interface 210 requests a free MMC block from the Kernel 220, initializes the MMC block with data read from the received data packet, and queues it into the Management Agent Task 225 working queue. If a return code sent back to the Transaction Interface 210 shows that this MMC block is currently at the top of the queue, the Management Agent Task 225 is not currently operating and must be started. The Transaction Interface 210 builds a DMC block and calls the Dispatcher 220 to start the Management Agent Task 225. The Dispatcher 220 then notifies the Management Agent Task 225 that it has an entry in its queue. The Management Agent Task 225 decodes the MMC block in its queue and the operation contained within. The operation that was decoded tells the Management Agent Task 225 that it must read the management ORB from the host. This includes transmitting from the Transaction Interface 210. A TMC block is created, initialized with the management ORB address and other parameters and queued in one of the TMC queues. The Management Agent Task 225 updates a task state in the MMC block stating that it is waiting for a management ORB fetch. If a return code indicates the TMC block is at the top of the queue, the Transaction Interface 210 must be started through the Dispatcher 220. After it begins execution, the Transaction Interface 210 decodes the TMC block to see it must schedule a transmission. It is scheduled and executes.

The Transaction Interface 210 receives the management ORB from the initiator. The Transaction Interface 210 then calls the Management Agent Task 225 with the login command. The Management Agent Task 225 attempts to login for the initiator. If all login criteria are met, the Management Agent Task 225 requests a new OMC block. The OMC block is then initialized with pertinent data, and a login response is built. The login response is scheduled with the Transaction Interface 210 by queuing a TMC block to one of the TMC queues, telling the initiator that the login was successful. Later, a status block is sent back to the initiator by queuing a TMC block into one the TMC queues. After the status block is sent, the original MMC block is deallocated, returned to the free memory block pool, and the Management Agent Task 225 operates on the next highest MMC block in its queue. As one skilled in the art will appreciate, any function for any protocol used as the transport layer 80 can be formed into tasks that the Transaction Interface 210 can call.

As a further example, FIG. 5 shows an embodiment of the invention that is using Function Control Protocol as its transport layer 80. Notice that the Transaction Hardware 205, Transaction Interface 210, and Kernel 220 have the same function as the embodiment shown in FIG. 3. Further, the Serial Bus Management Task 235 and Application Task 275 are also similar to the embodiment shown in FIG. 3. However, some tasks such as the Application/FCP Command Execution Task 295 will be created specifically for the protocol used, in this case FCP. The CSR Management Task 285 is an alternative method to include the CSR services, required to implement a 1394 bus, In the embodiment shown in FIG. 3, these services are handled by the Serial Bus Management Task 235.

Figure 13:
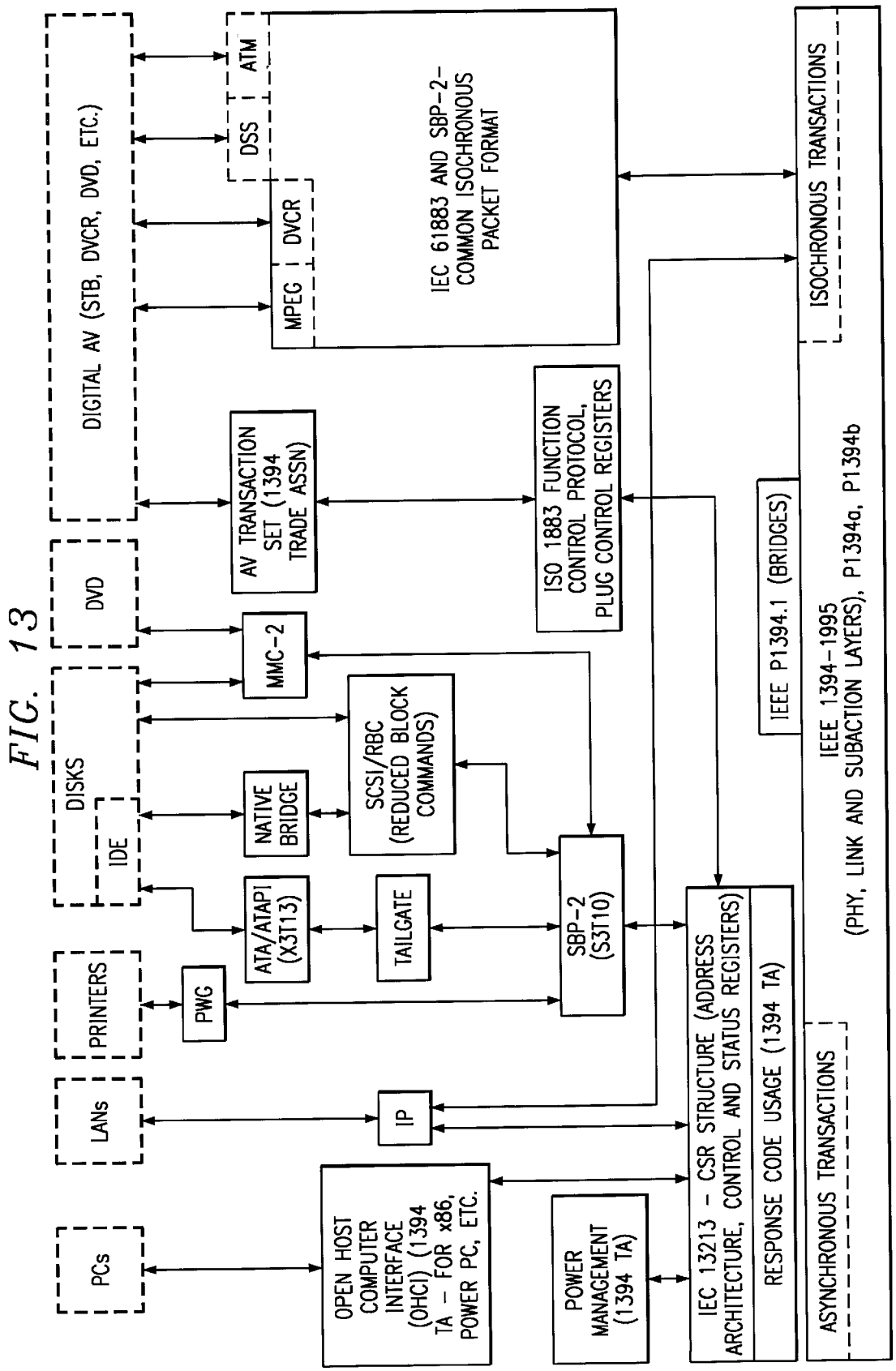
FIG. 13 is a chart showing applications and protocols that can be used with a 1394 bus.

Some of the possible applications and protocols for use with a 1394 bus are shown in FIG. 13. The 1394 bus, using the Communications Controller 200 as described herein, allows almost any type of peripheral device to be connected to one another. In FIG. 13, the 1394 bus is represented at the bottom of the figure and shows that it contains both asynchronous and isochronous capabilities. The next layer above the 1394 bus shows examples of the transport layer 80 shown in FIG. 2. Shown are SBP-2, FCP and SBP-2 common isochronous packet format. The next layer above the transport layer 80 shows examples of the application layer 90, as shown in FIG. 2. Shown are upper level protocols, such as MMC-2 used for hard disk drives and digital video disk drives, PWG, a protocol for use with printers, RBC, another protocol often used with hard disk drives, and an AV transaction set, used for consumer electronic devices. Next, shown above the application layer 90, are the devices that use the protocols listed underneath them, including printers, hard disc drives, DVD players, etc. Of course, other peripheral devices can use the 1394 bus to their advantage other than those listed here, and with different application or transport protocols. As stated above, this expands the compatibility of the 1394 bus with other buses.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. In a transport protocol interface coupled to a serial bus,
   a decoder coupled to the serial bus and structured to decode signals received from the serial bus into functions and data adhering to a transport protocol; and
   a plurality of tasks, each task structured to perform functions required by the transport protocol, and each task comprising at least one logic state and operating according to a predetermined state machine progression.

2. The transport protocol interface of claim 1, further comprising a scheduler structured to start the tasks when directed by the decoder or another one of the tasks.

3. The transport protocol interface of claim 2 wherein each task is structured to change states when it calls another task or when it calls a service, wherein at least one of the states in one of the plurality of tasks is structured to be in a suspended state pending notification by the scheduler that it can leave the suspended state and wherein the scheduler is structured to enable the task in the suspended state to change states following notification to the task.

4. The transport interface of claim 1 wherein more than one task is called to execute a particular function required by the transport protocol.

5. The transport interface of claim 1, further including at least one service structured to be called directly by one of the tasks.

6. The transport interface of claim 1 wherein the particular tasks are chosen to enable the transport interface to implement every function of a specific transport protocol.

7. The transport interface of claim 6 wherein the specific transport protocol is SBP-2.

8. The transport interface of claim 6 wherein one of the implemented functions of the transport protocol is "login."

9. A communication controller comprising:
a hardware bus interface coupled to a serial bus;
a packet decoder coupled to the bus interface, the packet decoder structured to decode data packets received from the bus interface into functions and data according to a transport protocol; and
a transport protocol interface architecture including
a plurality of tasks, each task comprising at least one logic state and operating according to a state machine, the plurality of tasks structured to perform all of the functions required by the transport protocol, and
a scheduler structured to start the tasks when directed by the packet
decoder or another one of the tasks, and structured to enable one of the plurality of tasks to change states.

10. The transport interface of claim 9 wherein more than one task is called to execute a particular function required by the transport protocol.

11. The transport protocol interface of claim 9 wherein each task is structured to change states when it calls another task or when it calls a service, wherein at least one of the states in one of the plurality of tasks is structured to be in a suspended state pending notification by the scheduler that it can leave the suspended state and wherein the scheduler is structured to enable the task in the suspended state to change states following notification to the task.

12. The transport interface of claim 9 wherein the specific transport protocol is IEC 61883 FCP/CMP.

13. The transport interface of claim 9, further including at least one service structured to be called directly by one of the tasks.

14. The transport interface of claim 9 wherein a task changes states when it must call another task or a service.

15. A method to implement a function in a transport protocol comprising:
receiving the function of the transport protocol;
passing to a task the necessary data to operate on the function, the task being in an initial state when the data is passed to it and the task having one or more states;
operating on the data by the task; and
returning notification by the task that the function has been completed.

16. The method of claim 15 wherein the task comprises more than one state and wherein operating on the data includes changing states within the task.

17. The method of claim 16 wherein a task changes states when it calls another task or when it calls a service.

18. The method of claim 15 wherein receiving a function of a transport protocol comprises decoding the function and other necessary data from a data packet.

19. An electronic machine readable medium whose contents allow an electronic device to implement a function in a transport protocol comprising the steps of:
receiving the function of the transport protocol;
passing to a task the necessary data to operate on the function, the task being in an initial state when the data is passed to it and the task having one or more states;
operating on the data by the task; and
returning notification by the task that the function has been completed.

20. The electronic machine readable medium of claim 19 wherein the task comprises more than one state and wherein operating on the data includes changing states within the task.

21. The electronic machine readable medium of claim 20 wherein a task changes states when it calls another task or when it calls a service.

22. The electronic machine readable medium of claim 19 wherein receiving a function of a transport protocol comprises decoding the function and other necessary data from a data packet.

* * * * *